United States Patent [19]
Tanaka et al.

[11] Patent Number: 5,768,224
[45] Date of Patent: Jun. 16, 1998

[54] AV SYSTEM AND METHOD OF ESTABLISHING A CONNECTION SETTING FOR AV COMPONENT DEVICES

[75] Inventors: Shigeo Tanaka, Tokyo; Hiroshi Yamazaki, Kanagawa; Noriko Kotabe, Chiba; Kouichi Sugiyama, Kanagawa; Makoto Sato, Kanagawa; Akira Katsuyama, Kanagawa; Yoshio Osakabe, Kanagawa; Yasuo Kusagaya, Tokyo, all of Japan

[73] Assignee: Sony Corporation, Tokyo, Japan

[21] Appl. No.: 373,279

[22] PCT Filed: May 30, 1994

[86] PCT No.: PCT/JP94/00853

§ 371 Date: Jan. 25, 1995

§ 102(e) Date: Jan. 25, 1995

[87] PCT Pub. No.: WO94/28674

PCT Pub. Date: Dec. 8, 1994

[30] Foreign Application Priority Data

May 28, 1993 [JP] Japan ................... 5-126682

[51] Int. Cl.[6] .................................................. H04N 5/765
[52] U.S. Cl. ............................. 369/33; 340/825.15
[58] Field of Search ...................... 345/185, 158, 345/902; 395/200.05, 513, 352, 356, 284, 504, 289, 290, 828, 835, 285; 348/5.5, 7, 569, 734; 340/825.08, 825.06; 364/132; 369/30, 32–34

[56] References Cited

U.S. PATENT DOCUMENTS

| | | |
|---|---|---|
| 4,965,557 | 10/1990 | Schepers et al. ............... 345/185 |
| 4,972,184 | 11/1990 | Go et al. |
| 5,073,773 | 12/1991 | Van Steenbrugge et al. |
| 5,101,197 | 3/1992 | Hix et al. ....................... 345/185 |
| 5,193,208 | 3/1993 | Yokota et al. |
| 5,204,662 | 4/1993 | Oda et al. |
| 5,223,825 | 6/1993 | Ikezaki. |
| 5,367,316 | 11/1994 | Ikezaki ........................ 345/158 |
| 5,402,115 | 3/1995 | Tanaka. |
| 5,432,505 | 7/1995 | Wise. |
| 5,436,676 | 7/1995 | Pint et al. ........................ 348/734 |
| 5,457,446 | 10/1995 | Yamamoto. |
| 5,532,753 | 7/1996 | Buchner et al. ............... 348/569 |
| 5,537,612 | 7/1996 | Cherrick et al. ............... 348/5.5 |
| 5,541,586 | 7/1996 | Wise. |
| 5,550,979 | 8/1996 | Tanaka et al. ............... 395/200.05 |
| 5,561,708 | 10/1996 | Remillard ........................ 348/7 |

*Primary Examiner*—Mark R. Powell
*Attorney, Agent, or Firm*—Jay H. Maioli

[57] ABSTRACT

In order to reduce the storage capacity required for storing system configuratuion information in an AV system composed of a plurality of AV component devices, a ROM 5A stores a plurality of predetermined systems configurations of the AV component devices. An SIP (system information pointer) memory 6 temporarily stores an SIP which indicates any of the system configurations stored in the ROM 5A. The SIP is finally stored in a nonvolatile memory which retains stored data after removal of electric power.

16 Claims, 35 Drawing Sheets

```
PLNO PLNO NM ADR SIG                          NM:NAME
-------------------------------                    (Device Name)
1-I/O---1-VTR1 120H CVBS/A-AUDIO              PLNO:
2-I/O---1-VTR2 121H                           AV Plug No.
3-I------1-LDP 130H                           I/O: Input/Output
```

FIG. 2

```
PLNO PLNO NM ADR SIG            (EXTNP) (PLNO)(NM)(ADR)(SIG)
-----------------------------------------------------------
1-I/O---1-VTR1 120H CVBS/A-AUDIO(2 -I/O-----1---VTR3 122H CY/AU)
2-I/O---1-VTR2 121H
3-I------1-LDP 130H
4-(Pointer to Ext - Auxiliary AV Center Information Table)
```

FIG. 3

```
PLNO PLNO NM ADR SIG            (EXTNP) (PLNO)(NM)(ADR)(SIG)
-----------------------------------------------------------
1-I/O---1-VTR1 120H CVBS/A-AUDIO(2 -I/O-----1---VTR3 122H CV/AU)
2-I/O---1-VTR2 121H                     (Pointer to Lower-Layer Sip)
3-I------1-LDP 130H
4-(Pointer to Ext - Auxiliary AV Center Information Table)
```

FIG. 4

CURSOR

| NUMBER OF PLUGS | P1 | P2 | P3 | P4 | SIPNO | IHP | ORIGINAL SIPNO |
|---|---|---|---|---|---|---|---|
| TV(1)/VTR1 | | | | | 09 | FEH | 1 |
| TV(1)/ | | | | LDP | 09 | F7H | 2 |
| TV(2)/VTR1VTR2 | | | | | 09 | FCH | 3 |
| TV(2)/VTR1 | | | | LDP | 09 | F6H | 4 |
| TV(3)/VTR1VTR2 | | | | LDP | 09 | F4H | 5 |
| TV(3)/VTR1VTR2VTR3 | | | | | 09 | F8H | 7 |
| TV(4)/VTR1VTR2VTR3 | | | | LDP | 09 | F0H | 9 |

| SIPNO | | TV(PLG) | VTR | LDP | A-AMP | V-TUNER | SUB/AV/CENTER |
|---|---|---|---|---|---|---|---|
| NO1 | TV/VTR | (11) | 1 | | | | |
| NO2 | TV/LDP | (11) | | 1 | | | |
| NO3 | TV/VTR1/VTR2 | (12) | 2 | | | | |
| NO4 | TV/VTR/LDP | (12) | 1 | 1 | | | |
| (NO5) | TV/VTR1/VTR2/LDP | (12) | 2 | 1 | | | |
| NO6 | TV/VTR1/VTR2/LDP | (13) | 2 | 1 | | | |
| NO7 | TV/VTR1/VTR2/VTR3 | (12) | 3 | | | | |
| *NO8 | TV/VTR1/VTR2/VTR3 | (13) | 3 | | | | |
| (NO9) | TV/VTR1/VTR2/VTR3/LDP | (14) | 3 | 1 | | | |
| NO21 | TV/VTR/A-AMP | (12) | 1 | | 1 | | |
| NO22 | TV/LDP/A-AMP | (12) | | 1 | 1 | | |
| NO23 | TV/VTR1/VTR2/A-AMP | (13) | 2 | | 1 | | |
| NO24 | TV/VTR/LDP/A-AMP | (13) | 1 | 1 | 1 | | |
| (NO25) | TV/VTR1/VTR2/LDP/A-AMP | (14) | 2 | 1 | 1 | | |
| NO27 | TV/VTR1/VTR2/VTR3/A-AMP | (14) | 3 | | 1 | | |
| (NO29) | TV/VTR1/VTR2/VTR3/LDP/A-AMP | (15) | 3 | 1 | 1 | | |
| NO31 | TV/VTR/TUNER (VU/BS/CS) | (12) | 1 | | | 1 | |
| NO32 | TV/LDP/TUNER (VU/BS/CS) | (12) | | 1 | | 1 | |
| NO33 | TV/VTR1/VTR2/VIDEO-TUNER | (13) | 2 | | | 1 | |
| NO34 | TV/VTR/LDP/VTUNER | (13) | 1 | 1 | | 1 | |
| (NO35) | TV/VTR1/VTR2/LDP/VTUNER | (14) | 2 | 1 | | 1 | |
| NO37 | TV/VTR1/VTR2/VTR3/VTUNER | (14) | 3 | | | 1 | |
| (NO39) | TV/VTR1/VTR2/VTR3/LDP/VTUNER | (15) | 3 | 1 | | 1 | |
| NO41 | TV/VTR/A-AMP/VTUNER | (13) | 1 | | 1 | 1 | |
| NO42 | TV/LDP/A-AMP/VTUNER | (13) | | 1 | 1 | 1 | |
| NO43 | TV/VTR1/VTR2/A-AMP/VTUNER | (14) | 2 | | 1 | 1 | |
| NO44 | TV/VTR/LDP/A-AMP/VTUNER | (14) | 1 | 1 | 1 | 1 | |
| (NO45) | TV/VTR1/VTR2/LDP/A-AMP/VTUNER | (15) | 2 | 1 | 1 | 1 | |
| NO47 | TV/VTR1/VTR2/VTR3/A-AMP/VTUNER | (15) | 3 | | 1 | 1 | |
| (NO49) | TV/VTR1/VTR2/VTR3/LDP/A-AMP/VTUNER | (16) | 3 | 1 | 1 | 1 | |

| | (AV CENTER) | | | | |
|---|---|---|---|---|---|
| | AMP(PLG) | TDECK | CD | AV-TUNER | SUB/AV/CENTER |
| NO51 AVAMP/TDECK | (1) | 1 | | | |
| NO52 AVAMP/CD | (1) | | 1 | | |
| NO53 AVAMP/TDECK/CD | (2) | 1 | 1 | | |
| NO54 AVAMP/TDECK/AVTUNER | (2) | 1 | | 1 | |
| [55] AVAMP/TDECK/CD/AVTUNER | (3) | 1 | 1 | 1 | |
| [59] AVAMP/TDECK/TDECK/CD/AVTUNER | (4) | 2 | 1 | 1 | |

FIG. 23

| | (AV CENTER)TV(PLG) | VTR | LDP | A-AMP | V-TUNER | SUB/AV/CENTER |
|---|---|---|---|---|---|---|
| NO101 TV/VTR/SUB | 1(2) | 1 | | | | 1 |
| NO102 TV/LDP/SUB | 1(2) | | 1 | | | 1 |
| NO103 TV/VTR1/VTR2/SUB | 1(3) | 2 | | | | 1 |
| NO104 TV/VTR/LDP/SUB | 1(3) | 1 | 1 | | | 1 |
| (NO105) TV/VTR1/VTR2/LDP/SUB | 1(4) | 2 | 1 | | | 1 |
| *NO106 TV/VTR1/VTR2/LDP | 1(3) | 2 | 1 | | | |
| NO107 TV/VTR1/VTR2/VTR3/SUB | 1(4) | 3 | | | | 1 |
| *NO108 TV/VTR1/VTR2/VTR3/SUB | 1(3) | 3 | | | | 1 |
| (NO109) TV/VTR1/VTR2/VTR3/LDP/SUB | 1(5) | 3 | 1 | | | 1 |
| NO121 TV/VTR/A-AMP(SUB) | 1(2) | 1 | | 1 | | |
| NO122 TV/LDP/A-AMP(SUB) | 1(2) | | 1 | 1 | | |
| NO123 TV/VTR1/VTR2/A-AMP(SUB) | 1(3) | 2 | | 1 | | |
| NO124 TV/VTR/LDP/A-AMP(SUB) | 1(3) | 1 | 1 | 1 | | |
| (125) TV/VTR1/VTR2/LDP/A-AMP(SUB) | 1(4) | 2 | 1 | 1 | | |
| (129) TV/VTR1/VTR2/VTR3/A-AMP(SUB) | 1(4) | 3 | | 1 | | |
| NO131 TV/VTR/VIDEO-TUNER/SUB | 1(3) | 1 | | | 1 | 1 |
| NO132 TV/LDP/VIDEO-TUNER/SUB | 1(3) | | 1 | | 1 | 1 |
| NO133 TV/VTR1/VTR2/VIDEO-TUNER/SUB | 1(4) | 2 | | | 1 | 1 |
| NO134 TV/VTR/LDP/VIDEO-TUNER/SUB | 1(4) | 1 | 1 | | 1 | 1 |
| (135) TV/VTR1/VTR2/LDP/VIDEO-TUNER/SUB | 1(5) | 2 | 1 | | 1 | 1 |
| (137) TV/VTR1/VTR2/VTR3/VIDEO-TUNER/SUB | 1(5) | 3 | | | 1 | 1 |
| (139) TV/VTR1/VTR2/VTR3/LDP/VIDEO-TUNER/SUB | 1(6) | 3 | 1 | | 1 | 1 |
| NO141 TV/VTR/A-AMP/VIDEO-TUNER/SUB | 1(4) | 1 | | 1 | 1 | 1 |
| NO142 TV/LDP/A-AMP/VIDEO-TUNER/SUB | 1(4) | | 1 | 1 | 1 | 1 |
| NO143 TV/VTR1/VTR2/A-AMP/VIDEO-TUNER/SUB | 1(5) | 2 | | 1 | 1 | 1 |
| NO144 TV/VTR/LDP/A-AMP/VIDEO-TUNER/SUB | 1(5) | 1 | 1 | 1 | 1 | 1 |
| (145) TV/VTR1/VTR2/LDP/A-AMP/VIDEO-TUNER/SUB | 1(6) | 2 | 1 | 1 | 1 | 1 |
| NO147 TV/VTR1/VTR2/VTR3/A-AMP/VIDEO-TUNER/SUB | 1(6) | 3 | | 1 | 1 | 1 |
| (149) TV/VTR1/VTR2/VTR3/LDP/A-AMP/VIDEO-TUNER/SUB | 1(7) | 3 | 1 | 1 | 1 | 1 |

FIG. 24

| | (AV CENTER) AMP(PLG) | TDECK | CD | AV-TUNER | SUB/AV/CENTER |
|---|---|---|---|---|---|
| NO151 AVAMP/TDECK/SUB AV CENTER | (2) | 1 | | | 1 |
| NO152 AVAMP/CD/SUB | (2) | | 1 | | 1 |
| NO153 AVAMP/TDECK/CD/SUB | (3) | 1 | 1 | | 1 |
| NO154 AVAMP/TDECK/AVTUNER/SUB | (3) | 1 | | 1 | 1 |
| [155] AVAMP/TDECK/CD/AVTUNER/SUB | (4) | 1 | 1 | 1 | 1 |
| [159] AVAMP/TDECK/TDECK/CD/AVTUNER/SUB | (5) | 2 | 1 | 1 | 1 |

FIG. 25

NO1 TV/VTR
                       TV 1C8H (AV CENTER)
                          1
                          1
NO2 TV/LDP         VTR 120H
                       TV 1C8H (AV CENTER)
                          1
                          1
NO3 TV/VTR1/VTR2  LDP 130H
                     TV 1C8H (AV CENTER)
        1               2
        1               1
   120  VTR1     VTR2 121
NO4 TV/VTR/LDP
                     TV 1C8H (AV CENTER)
        1               2
        1               1
   120  VTR      LDP  130
NO5 TV/VTR1/VTR2/LDP
                     TV 1C8H (AV CENTER)
        1          2        3
        1          1        1
   120  VTR1     VTR2 121H LDP  130H
NO6 TV/VTR1/VTR2/LDP
                     TV 1C8H (AV CENTER)
        1               2
        1               1
  120H VTR1     VTR2 121H
        2
        1
      LDP  130H
NO7 TV/VTR1/VTR2/VTR3
                     TV 1C8H (AV CENTER)
        1          2        3
        1          1        1
  120H VTR1     VTR2 121H VTR3 122H
NO8 TV/VTR1/VTR2/VTR3
                     TV 1C8H (AV CENTER)
        1          2        3
        1          1        1
  120H VTR1     VTR2 121H VTR3 122H
NO9 TV/VTR1/VTR2/VTR3/LDP
                     TV 1C8H (AV CENTER)
        1          2        3        4
        1          1        1        1
  120H VTR1     VTR2 121H VTR3 122H LDP  130H

FIG. 26

NO21 TV/VTR/A-AMP
   TV 1C8H (AV CENTER)
 1  2
 1  1
 VTR  A-AMP
 120H 108H

NO22 TV/LDP/A-AMP
   TV 1C8H (AV CENTER)
 1  2
 1  1
 LDP  A-AMP
 130H 108H

NO23 TV/VTR1/VTR2/A-AMP
   TV 1C8H (AV CENTER)
 1  2  3
 1  1  1
 VTR1 VTR2 A-AMP
 120H 121H 108H

NO24 TV/VTR/LDP/A-AMP
   TV 1C8H (AV CENTER)
 1  2  3
 1  1  1
 VTR  LDP  A-AMP
 120H 130H 108H

NO25 TV/VTR1/VTR2/LDP/A-AMP
   TV 1C8H (AV CENTER)
 1  2  3  4
 1  1  1  1
 VTR1 VTR2 LDP  A-AMP
 120H 121H 130H 108H

NO27 TV/VTR1/VTR2/VTR3/A-AMP
   TV 1C8H (AV CENTER)
 1  2  3  4
 1  1  1  1
 VTR1 VTR2 VTR3 A-AMP
 120H 121H 122H 108H

NO29 TV/VTR1/VTR2/VTR3/LDP/A-AMP
   TV 1C8H (AV CENTER)
 1  2  3  4  5
 1  1  1  1  1
 VTR1 VTR2 VTR3 LDP  A-AMP
 120H 121H 122H 130H 108H

FIG. 27

NO31 TV/VTR/VIDEO-TUNER
```
            TV 1C8H (AV CENTER)
1           2
1           1
VTR         VIDEO-TUNER
120H
```

NO32 TV/LDP/VIDEO-TUNER
```
            TV 1C8H (AV CENTER)
1           2
1           1
LDP         VIDEO-TUNER
130H
```

NO33 TV/VTR1/VTR2/VIDEO-TUNER
```
            TV 1C8H (AV CENTER)
1           2           3
1           1           1
VTR1        VTR2        VIDEO-TUNER
120H        121H        128H
```

NO34 TV/VTR/LDP/VIDEO-TUNER
```
            TV 1C8H (AV CENTER)
1           2           3
1           1           1
VTR         LDP         VIDEO-TUNER
120H        130H        128H
```

NO35 TV/VTR1/VTR2/LDP/VIDEO-TUNER
```
            TV 1C8H (AV CENTER)
1           2           3           4
1           1           1           1
VTR1        VTR2        LDP         VIDEO-TUNER
120H        121H        130H        128H
```

NO37 TV/VTR1/VTR2/VTR3/VIDEO-TUNER
```
            TV 1C8H (AV CENTER)
1           2           3           4
1           1           1           1
VTR1        VTR2        VTR3        VIDEO-TUNER
120H        121H        122H        128H
```

NO39 TV/VTR1/VTR2/VTR3/LDP/VIDEO-TUNER
```
            TV 1C8H (AV CENTER)
1           2           3           4           5
1           1           1           1           1
VTR1        VTR2        VTR3        LDP         VIDEO-TUNER
120H        121H        122H        130H        128H
```

FIG. 28

NO41 TV/VTR/AAMP/VTUNER
        TV 1C8H (AV CENTER)
1         2         3
1         1         1
VTR      AAMP     VIDEO-TUNER
120H     108H     128H

NO42 TV/LDP/AAMP/VTUNER
        TV 1C8H (AV CENTER)
1         2         3
1         1         1
LDP      AAMP     VIDEO-TUNER
130H     108H     128H

NO43 TV/VTR1/VTR2/AAMP/VTUNER
        TV 1C8H (AV CENTER)
1         2         3         4
1         1         1         1
VTR1     VTR2     AAMP     VIDEO-TUNER
120H     121H     108H     128H

NO44 TV/VTR/LDP/AAMP/VTUNER
        TV 1C8H (AV CENTER)
1         2         3         4
1         1         1         1
VTR      LDP      AAMP     VIDEO-TUNER
120H     130H     108H     128H

NO45 TV/VTR1/VTR2/LDP/AAMP/VTNR
        TV 1C8H (AV CENTER)
1         2         3         4         5
1         1         1         1         1
VTR1     VTR2     LDP      AAMP     VIDEO-TUNER
120H     121H     130H     108H     128H

NO47 TV/VTR1/VTR2/VTR3/AAMP/VTU
        TV 1C8H (AV CENTER)
1         2         3         4         5
1         1         1         1         1
VTR1     VTR2     VTR3     AAMP     VIDEO-TUNER
120H     121H     130H     108H     128H

NO49 TV/VTR1/VTR2/VTR3/LDP/AAMP/TU
        TV 1C8H (AV CENTER)
1         2         3         4         5         6
1         1         1         1         1         1
VTR1     VTR2     VTR3     LDP      AAMP     VIDEO-TUNER
120H     121H     122H     130H     108H     128H

FIG. 29

NO51 AVAMP/TDECK
        AVAMP 1C8H (AV CENTER)
1      2      3
1
TDECK

NO52 AVAMP/CD
        AVAMP 1C8H (AV CENTER)
1      2      3
       1
       CD

NO53 AVAMP/TDECK/CD
        AVAMP 1C8H (AV CENTER)
1      2      3
1      1
TDECK  CD

NO54 AVAMP/TDECK/AVTUNER
        AVAMP 1C8H (AV CENTER)
1      2      3
1            1
TDECK      AVTUNER

NO55 AVAMP/TDECK/CD/AVTUNER
        AVAMP 1C8H (AV CENTER)
1      2      3
1      1      1
TDECK  CD    AVTUNER

NO59 AVAMP/TDECK/TDECK/CD/AVTUNER
        AVAMP 1C8H (AV CENTER)
1      2      3      4
1      1      1      1
TDECK  TDECK  CD    AVTUNER

FIG. 30

NO107 TV/VTR1/VTR2/VTR3/SUB AV CENTER
TV 1C8H (AV CENTER)

| 1 | 2 | 3 | 4 |
|---|---|---|---|
| 1 | 1 | 1 | 1 |
| VTR1 | VTR2 | VTR3 | SUB AV |
| 120H | 121H | 122H | 1C9H |

NO109 TV/VTR1/VTR2/VTR3/LDP/SUB AV CENTER
TV 1C8H (AV CENTER)

| 1 | 2 | 3 | 4 | 5 |
|---|---|---|---|---|
| 1 | 1 | 1 | 1 | 1 |
| VTR1 | VTR2 | VTR3 | LDP | SUB AV |
| 120H | 121H | 122H | 130H | 1C9H |

NO127 TV/VTR1/VTR2/VTR3/(A-AMP)SUB AV CENTER         SAME AS NO107
TV 1C8H (AV CENTER)

| 1 | 2 | 3 | 4 |
|---|---|---|---|
| 1 | 1 | 1 | 1 |
| VTR1 | VTR2 | VTR3 | (A-AMP)SUB AV |
| 120H | 121H | 122H | 1C9H |

NO129 TV/VTR1/VTR2/VTR3/LDP/SUB AV CENTER           SAME AS NO109
TV 1C8H (AV CENTER)

| 1 | 2 | 3 | 4 | 5 |
|---|---|---|---|---|
| 1 | 1 | 1 | 1 | 1 |
| VTR1 | VTR2 | VTR3 | LDP | (AAMP)SUB AV |
| 120H | 121H | 122H | 130H | 1C9H |

NO157 AVAMP/TDECK/CD/AVTUNER/SUB AV CENTER
AVAMP 1C8H (AV CENTER)

| 1 | 2 | 3 | 4 |
|---|---|---|---|
| 1 | 1 | 1 | 1 |
| TDECK | CD | AVTUNER | SUB AV CENTER 1C9H |

NO159 AVAMP/TDECK/TDECK/CD/AVTUNER/SUB AV CENTER
AVAMP 1C8H (AV CENTER)

| 1 | 2 | 3 | 4 | 5 |
|---|---|---|---|---|
| 1 | 1 | 1 | 1 | 1 |
| TDECK | TDECK | CD | AVTUNER | SUB AV CENTER 1C9H |

FIG. 31

| SIPNO | (AV CENTER) TV(PLG) | VTR | LDP | AAMP | VTUNER | SUB | AV CENTER |
|---|---|---|---|---|---|---|---|
| [NO 5] TV/VTR1/VTR2/LDP | 1(3) | 2 | 1 | | | | |
| *NO 6 TV/VTR1/VTR2/LDP | 1(2) | 2 | 1 | | | | |
| *NO 8 TV/VTR1/VTR2/VTR3 | 1(2) | 3 | | | | | |
| [NO 9] TV/VTR1/VTR2/VTR3/LDP | 1(4) | 3 | 1 | | | | |
| [NO 25] TV/VTR1/VTR2/LDP/A-AMP | 1(4) | 2 | 1 | 1 | | | |
| [NO 29] TV/VTR1/VTR2/VTR3/LDP/AAMP | 1(5) | 3 | 1 | 1 | | | |
| [NO 35] TV/VTR1/VTR2/LDP/VTUNER | 1(4) | 2 | 1 | | 1 | | |
| [NO 39] TV/VTR1/VTR2/VTR3/LDP/VTUNER | 1(5) | 3 | 1 | | 1 | | |
| [NO 45] TV/VTR1/VTR2/LDP/A-AMP/V-TUNER | 1(5) | 2 | 1 | | | 1 | |
| [NO 49] TV/VTR1/VTR2/VTR3/LD/A-AMP/VTUNER | 1(6) | 3 | 1 | | | 1 | |

FIG. 32

|  | (AV CENTER) AMP(PLG) | TDECK | CD | AVTUNER | DAT | SUB AV CENTER |
|---|---|---|---|---|---|---|
| [55] AVAMP/TDECK/CD/AVTUNER | (3) | 1 | 1 | 1 | | |
| [59] AVAMP/TDECK/TDECK/CD/AVTUNER | (4) | 2 | 1 | 1 | | |
| NO 60 AVAMP/DAT=TDECK/CD/AVTUNER | (4) | 1 | 1 | 1 | 1 | (DIRECTLY CONNECTED TO TAPE DECK) |
| NO 61 AVAMP/DAT=TDECK/TDECK/CD/AVTUNER | (5) | 2 | 1 | 1 | 1 | (DIRECTLY CONNECTED TO TAPE DECK) |

FIG. 33

(AV CENTER)

| | TV(PLG) | VTR | LDP | A-AMP | V-TUNER | SUB/AV/CENTER |
|---|---|---|---|---|---|---|
| (NO105) TV/VTR1/VTR2/LDP/SUB | 1(4) | 2 | 1 | | | 1 |
| *NO106 TV/VTR1/VTR2/LDP | 1(3) | 2 | 1 | | | 1 |
| *NO108 TV/VTR1/VTR2/VTR3/SUB | 1(3) | 3 | | | | 1 |
| (NO109) TV/VTR1/VTR2/VTR3/LDP/SUB | 1(5) | 3 | 1 | | | 1 |
| (NO125) TV/VTR1/VTR2/LDP/A-AMP(SUB) | 1(4) | 2 | 1 | | | 1 |
| (NO129) TV/VTR1/VTR2/VTR3/LDP/A-AMP | 1(5) | 3 | 1 | | | 1 |
| (NO135) TV/VTR1/VTR2/LDP/VIDEO-TUNER/SUB | 1(5) | 2 | 1 | | 1 | 1 |
| (NO139) TV/VTR1/VR2/VTR3/LDP/VIDEO-TUNER/SUB | 1(6) | 3 | 1 | | 1 | 1 |
| (NO145) TV/VTR1/VTR2/LDP/A-AMP/VIDEO-TUNER/SUB | 1(6) | 2 | 1 | 1 | 1 | 1 |
| (NO149) TV/VR1/VTR2/VTR3/LDP/A-AMP/VIDEO-TUNER/SUB | 1(7) | 3 | 1 | 1 | 1 | 1 |

FIG. 34

| | (AV CENTER) | | | | |
|---|---|---|---|---|---|
| | AMP(PLG) | TDECK | CD | AV-TUNER | SUB/AV/CENTER |
| (NO155) AVAMP/TDECK/CD/AVTUNER/SUB | (4) | 1 | 1 | 1 | 1 |
| (NO159) AVAMP/TDECK/TDECK/CD/AVTUNER/SUB | (5) | 2 | 1 | 1 | 1 |

NO255 DEFINED AS "UNSET" (UPON SHIPMENT FROM FACTORY)

FIG. 35

AV SYSTEM AND METHOD OF ESTABLISHING A CONNECTION SETTING FOR AV COMPONENT DEVICES

TECHNICAL FIELD

The present invention relates to an AV (audio/video) system composed of a plurality of AV component devices and a method of establishing a connection setting for the AV component devices.

BACKGROUND ART

AV systems are composed of a plurality of AV component devices including a TV (television) set, a VTR (video tape recorder), an LDP (laser disc player), etc. which are connected in a certain configuration.

Since such AV systems allow their component devices to be connected in all possible configurations, a ROM must have a large storage capacity for storing system configuration information, and the user finds it difficult to establish a connection setting for the component devices of the system.

In the conventional AV systems, the system configuration representing a connection setting for a plurality of AV component devices is stored as it is in a nonvolatile memory (NVRAM). Since the nonvolatile memory is expensive, the storage capacity thereof needs to be as small as possible.

DISCLOSURE OF THE INVENTION

In view of the above conventional problems, it is a first object of the present invention to provide an AV system having a nonvolatile memory of as small a storage capacity as possible for storing system configuration information.

A second object of the present invention is to provide an AV system which allows the storage capacity of a ROM for storing system configuration information in advance to be as small as possible.

A third object of the present invention is to provide a method of simply establishing a connection setting for AV component devices.

According to a first invention, an AV system comprises an AV center and a plurality of AV component devices, the AV center comprising configuration storage means for storing a predetermined system configuration of the AV component devices, and a nonvolatile memory for storing at least pointer information of the predetermined system configuration stored in the configuration storage means. This arrangement allows a given system configuration of the AV component devices to be stored well.

According to a second invention, an AV system comprises an AV center and a plurality of AV component devices, the AV center comprising configuration storage means for storing a plurality of predetermined system configurations of the AV component devices, selecting means for selecting one of the system configurations based on inputted information from a user, and a nonvolatile memory for storing at least pointer information of the system configuration selected by the selecting means. This arrangement allows certain system configurations of the AV component devices to be stored, and each one of the system configuration is marked by a pointer, reducing the storage capacity for storing the system configurations.

According to a third invention, an AV system comprises an AV center and a plurality of AV component devices, the AV center comprising configuration storage means for storing a predetermined system configuration of the AV component devices, and a nonvolatile memory for storing difference information indicative of the difference between the system configuration stored in the configuration storage means and a desired system configuration, the configuration storage means containing an upper system configuration and including a plurality of system configurations between the AV center and the AV component devices. This arrangement allows a given system configuration of the AV component devices to be stored efficiently.

According to a fourth invention, an AV system comprises an AV center and a plurality of AV component devices, the AV center comprising configuration storage means for storing a plurality of predetermined system configurations of the AV component devices, selecting means for selecting one of the system configurations based on inputted information from a user, and a nonvolatile memory for storing difference information indicative of the difference between the system configuration stored in the configuration storage means and a given system configuration. This arrangement allows given system configurations of the AV component devices to be stored efficiently.

According to a fifth invention, an AV system comprises an AV center and a plurality of AV component devices, the AV center comprising configuration storage means for storing a predetermined system configuration of the AV component devices, and a nonvolatile memory for storing pointer information of the predetermined system configuration stored in the configuration storage means and difference information indicative of the difference between the system configuration stored in the configuration storage means and a given system configuration. This arrangement allows given system configurations of the AV component devices to be stored, and any one of the system configuration is indicated by a pointer, reducing the storage capacity for storing the system configurations.

According to a sixth invention, in the AV system according to the first or second invention, the nonvolatile memory stores inhibit plug information indicative of inhibit plugs of the plugs of the AV component devices. This arrangement allows an AV component device inhibited from use to be set up easily.

According to a seventh invention, in the AV system according to the sixth invention, the AV center and the AV component devices are connected to each other by an AV bus, the AV center comprising control means for controlling data transmission between the AV center and the AV component devices through the AV bus. This arrangement allows the AV center to control the AV component devices well.

According to an eighth invention, the AV system according to the seventh invention further comprises display means for displaying information relative to connection settings of the AV component devices, the arrangement being such that when a connection is to be set up, the control means displays a command on the display means prompting a user to input information of an AV component device to be connected, generates the pointer information indicative of the system configuration selected based on the inputted information from the user, and stores the pointer information in the nonvolatile memory. This arrangement allows a connection setting to be inputted well based on the display, and an inputted system configuration to be stored as a pointer.

According to a ninth invention, in the AV system according to the eighth invention, the control means determines whether the system configuration stored in the configuration storage means is a system configuration requested by the user, and stores the difference the system configurations in the nonvolatile memory if the system configurations differ from each other. This arrangement can cope with a situation in which the requested system configuration differs from the stored system configuration.

According to a tenth invention, in the AV system according to the eighth invention, the control means determines whether the system configuration stored in the configuration storage means is a system configuration requested by the user, and stores the inhibit plug information in the nonvolatile memory if the system configuration has the inhibit plugs. This arrangement can cope with a situation in which an AV component device inhibited from use is connected.

According to an eleventh invention, in the AV system according to the eighth invention, the control means display a procedure for connecting AV lines of the AV component devices on the display means. This arrangement allows the user to make connections easily.

According to a twelfth invention, in the AV system according to the eleventh invention, the control means requests the AV component devices to generate a test signal to confirm a connected state of the AV component devices. This arrangement allows a connected state to be confirmed.

According to a thirteenth invention, in the AV system according to the twelfth invention, the control means transmits an existence confirmation signal to confirm the existence of the AV component devices to the AV component devices, and the AV component devices output the test signal in response to the existence confirmation signal. This arrangement allows the existence of a connected AV component device to be confirmed reliably.

According to a fourteenth invention, a method of establishing a connection setting to connect an AV center and a plurality of AV component devices in layers, comprises the steps of displaying connection patterns of the AV component devices which are stored in connection pattern storage means on display means in each of the layers, and selecting, by a user, a certain pattern from the connection patterns which are displayed. This arrangement allows a connection setting to be made in layers for improved operability.

According to a fifteenth invention, the method according to the fourteenth invention further comprises the step of prompting the user to input information relative to an AV component device which is requested to be connected by the user, and establishing a connection pattern corresponding to the information which is inputted. This arrangement prompts the user to input information for improved operability.

According to a sixteenth invention, the method according to the fourteenth invention further comprises the step of, if the connection pattern which the user desires does not exist in the connection pattern storage means, connecting another AV component device to an empty terminal of a given one of the AV component devices, and establishing a connection pattern in which the AV component device connected to the empty terminal is added to a connection pattern. This arrangement is capable of coping with a situation in which there is no connection pattern which the user desires.

BRIEF DESCRIPTION OF THE DRAWINGS

FIG. 2 is a diagram showing, by way of example, system configuration information which is stored in a ROM (5A) and indicated by an SIP;

FIG. 3 is a diagram showing, by way of example, other system configuration information which is stored in the ROM and indicated by the SIP;

FIG. 4 is a diagram showing, by way of example, still other system configuration information which is stored in the ROM and indicated by the SIP;

FIG. 18 is a flowchart of an operation sequence when a main power supply that has been turned off is turned on;

FIG. 19 is a diagram showing variations using SIP and IHP;

FIG. 22 is a diagram which shows, by way of example, designated SIP numbers;

FIG. 23 is a diagram which shows, by way of example, designated SIP numbers;

FIG. 24 is a diagram which shows, by way of example, designated SIP numbers;

FIG. 25 is a diagram which shows, by way of example, designated SIP numbers;

FIG. 26 is a diagram which shows specific AV system configurations, by way of example;

FIG. 27 is a diagram which shows specific AV system configurations, by way of example;

FIG. 28 is a diagram which shows specific AV system configurations, by way of example;

FIG. 29 is a diagram which shows specific AV system configurations, by way of example;

FIG. 30 is a diagram which shows specific AV system configurations, by way of example;

5

Figure 36:
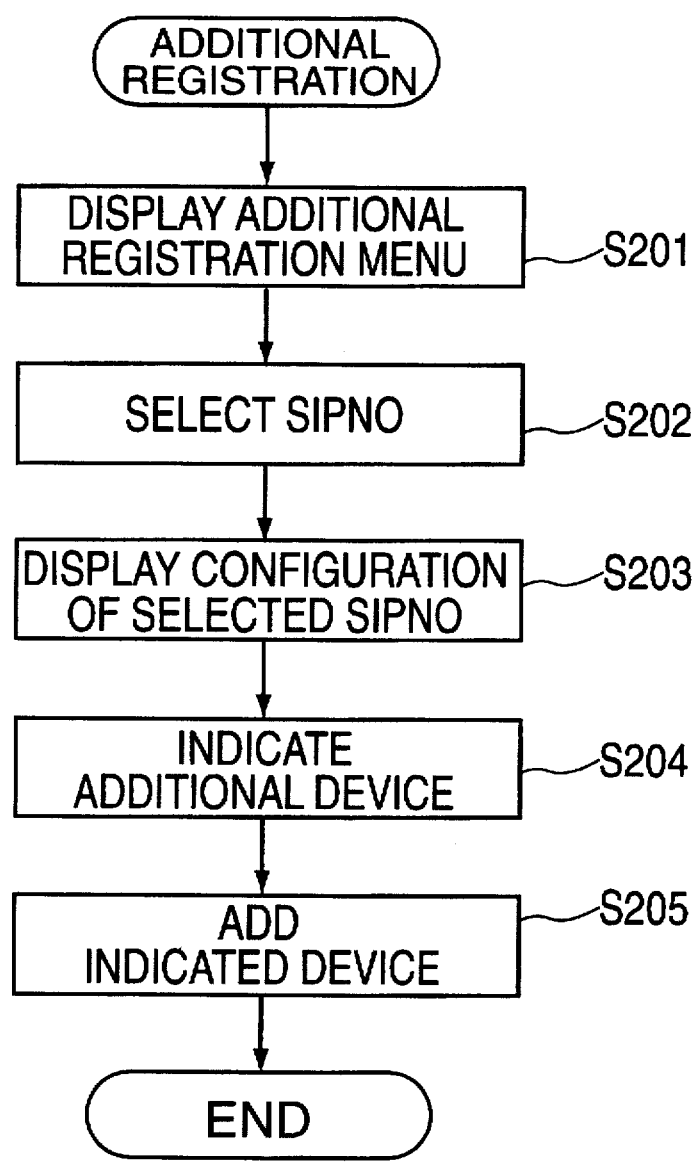
Figure 37:
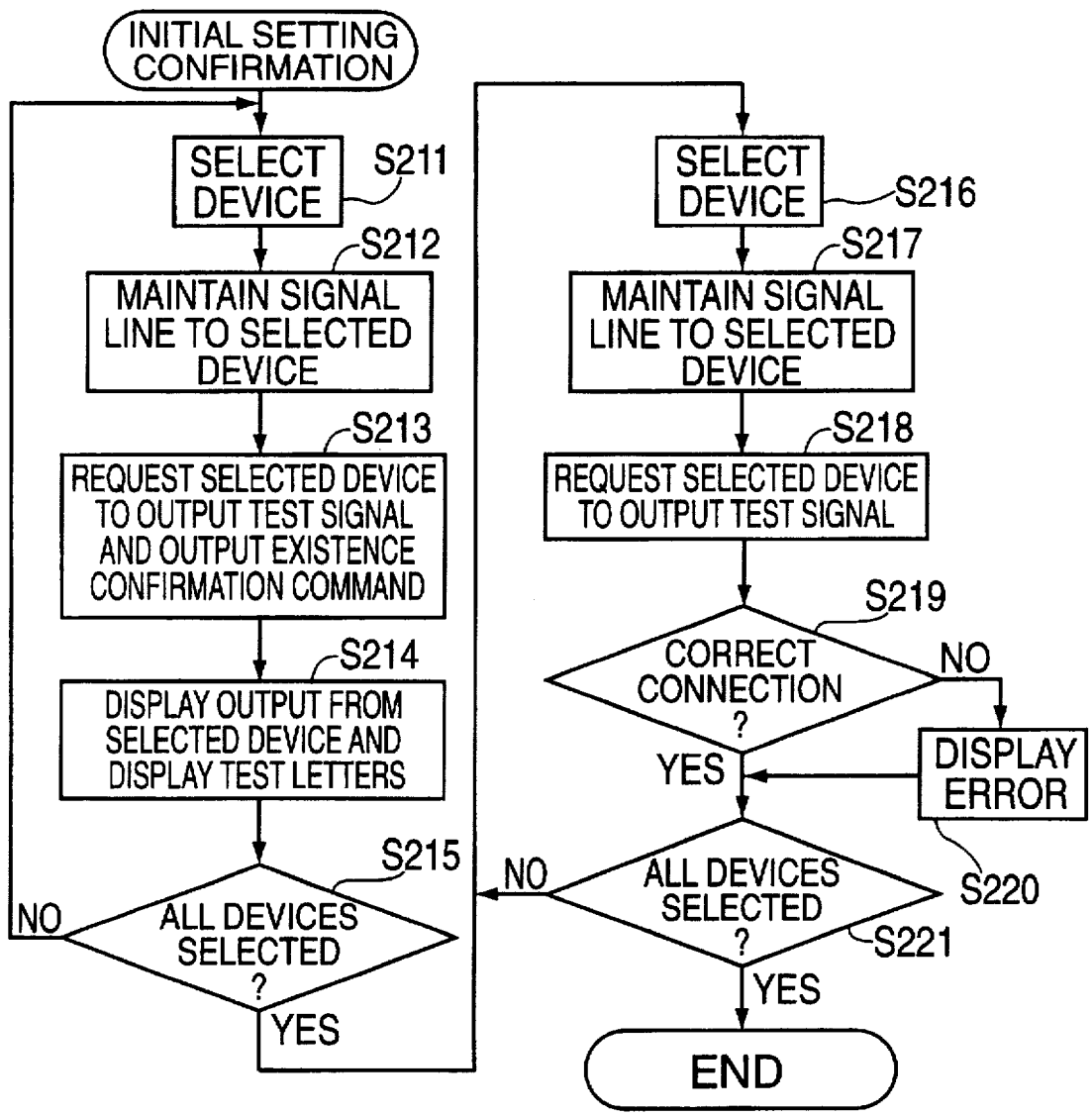

FIG. 31 is a diagram which shows specific AV system configurations, by way of example;

FIG. 32 is a diagram which shows, by way of example, other designated SIP numbers;

FIG. 33 is a diagram which shows, by way of example, other designated SIP numbers;

FIG. 34 is a diagram which shows, by way of example, other designated SIP numbers;

FIG. 35 is a diagram which shows, by way of example, other designated SIP numbers;

FIG. 36 is a flowchart of a process of additionally registering an AV component device connected to empty terminals;

FIG. 37 is a flowchart of another process of confirming a connected state; and

Figure 38:
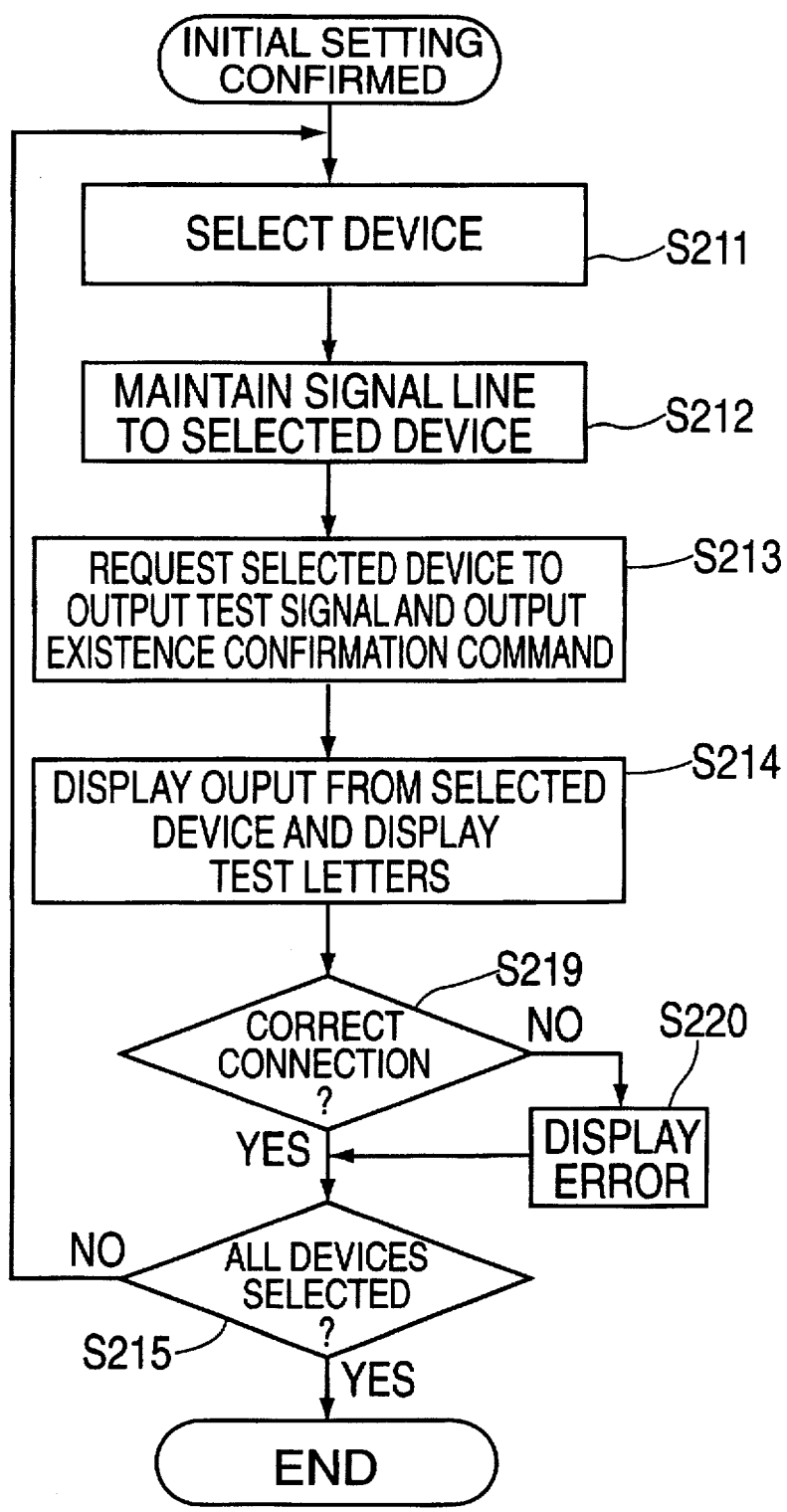

FIG. 38 is a flowchart of a simplified version of the process shown in FIG. 37.

BEST MODE FOR CARRYING OUT THE INVENTION

Figure 1:
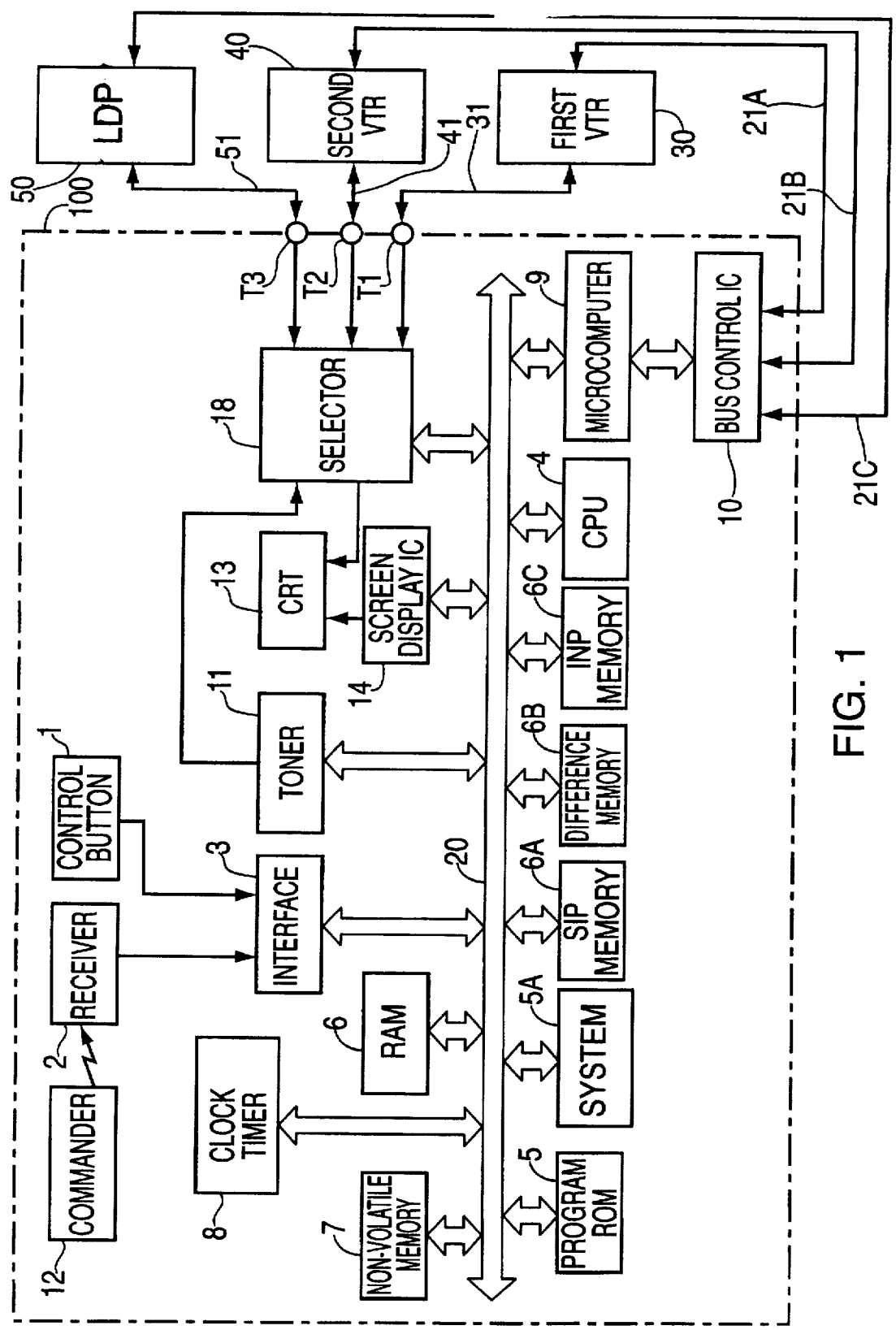
FIG. 1 is a block diagram of an AV system according to an embodiment of the present invention.

FIG. 1 shows an AV system according to the present invention. When a control button 1 of a TV set (100) operating as an AV center is pressed, a command is applied through an interface 3 and an internal bus 20 to a CPU 4. When a commander 12 is operated, the commander 12 emits an infrared radiation signal to a receiver 2. In response to the received infrared emission, the receiver 2 applies a command through the interface 3 and the internal bus 20 to the CPU 4.

To the CPU 4 there are connected through the internal bus 20, the interface 3, a program ROM 5, a system configuration information ROM 5A, a RAM 6, an SIP (system information pointer) memory 6A, a difference information memory 6B, an IHP (inhibit plug bit) memory 6C, a non-volatile memory 7, a clock timer 8, a microcomputer 9 for AV bus control communication, a tuner 11, a screen display IC 14, and a selector 18.

The CPU 4 processes the applied command to effect various processes, e.g., to output a channel selection command to the tuner 11 and a command to the microcomputer 9.

The program ROM 5 stores a program that is required for the CPU 4 to operate. The RAM 6 stores data that have been processed by the CPU 4. The nonvolatile memory 7 stores data which need to be retained after the power supply is turned off, e.g., data indicating statuses of connection to other AV component devices (a first VTR (video tape recorder) 30, a second VTR 40, and an LDP (laser disc player) 50. The clock timer 8 always measures time and generates time information.

The system configuration information ROM 5A stores a plurality of items of information which represent predetermined system configurations (connected patterns) between various AV component devices including the TV set 100, the first and second VTRs 30, 40, and the LDP 50. The SIP memory 6A comprises a RAM for storing an SIP that indicates any of the information representative of the system configurations stored in the system configuration information ROM 5A. FIGS. 2, 3, and 4 respectively show, by way of example, three system configurations stored in the ROM 5A that are indicated by the SIP stored in the SIP memory 6A.

FIG. 2 shows that the AV center 100 has three plugs, plugs 1 and 2 being input/output plugs and a plug 3 being an input plug. The plug 1 is connected to a jack 1 of the VTR 1 having

6 an address 120H, the plug 2 to a jack 1 of the VTR 2 having an address 121H, and the plug 3 to a jack 1 of the LDP having an address 130H. Signals inputted to and outputted to these plugs are a composite video signal (CVBS) and an analog audio signal (A-AUDIO).

In FIG. 3, an auxiliary AV center is connected to a plug 4. To a jack 2 of the VTR 2 connected to the plug 1, there is connected a plug 1 of a VTR 3 having an address 122H.

As shown in FIG. 4, if a lower-layer AV component device is connected to the VTR 3, then the VTR 3 becomes a pointer for a lower-layer SIP.

The difference information memory 6B comprises a RAM for storing the difference between the system configurations stored in the system configuration information ROM 5A and a certain system configuration which the user desires. The IHP memory 6C comprises a RAM for storing inhibit plug information indicative of inhibit plugs of the AV component devices including the TV set 100, the first and second VTRs 30, 40, and the LDP 50. The RAM 6, the SIP memory 6A, the difference information memory 6B, and the IHP memory 6C may be composed of a single RAM.

The microcomputer 9 for performing AV bus control communication is connected to other AV component devices including the first VTR 30, the second VTR 40, and the LDP 50 through an IC 10 for AV bus control communication, an AV bus, and AV bus control lines 21A, 21B, 21C in a star-connection pattern for transmission and reception of data and commands.

In the embodiment shown in FIG. 1, the other AV component devices are connected to the AV center 100, and the AV center 100 manages the overall connection information.

The first VTR 30 is connected to a terminal T1 of the selector 18 through an AV signal line 31 for transmitting video and audio signals to and receiving video and audio signals from the selector 18. The second VTR 40 is connected to a terminal T2 of the selector 18 through an AV signal line 41 for transmitting video and audio signals to and receiving video and audio signals from the selector 18. The LDP 50 is connected to a terminal T3 of the selector 18 through an AV signal line 51 for transmitting video and audio signals to and receiving video and audio signals from the selector 18.

Video and audio signals outputted from the selector 18 are selected by the CPU 4 or the microcomputer 9.

The AV center 100 includes a CRT (cathode-ray tube) 13 for displaying an image represented by the video signal outputted from the selector 18. The screen display IC 14 displays on-screen display (OSD) data supplied from the microcomputer 9 through the internal bus 20, as a message in a given area on the screen of the CRT 13. The audio signal outputted from the selector 18 is reproduced by a loudspeaker (not shown).

The control button 1, the receiver 2, the interface 3, the CPU 4, the program ROM 5, the system configuration information ROM 5A, the RAM 6, the SIP memory 6A, the difference information memory 6B, the IHP memory 6C, the nonvolatile memory 7, the clock timer 8, the microcomputer 9 for AV bus control communication, the IC 10 for AV bus control communication, the CRT 13, the screen display IC 14, the tuner 11, the selector 18, and the loudspeaker (not shown) jointly make up the AV center or TV set 100.

Each of the first VTR 30, the second VTR 40, and the LDP 50 has a microcomputer and an IC for AV bus control communication, which transmit and receive command and OSD data through the AB bus control lines 21A, 21B, 21C.

Figure 5:
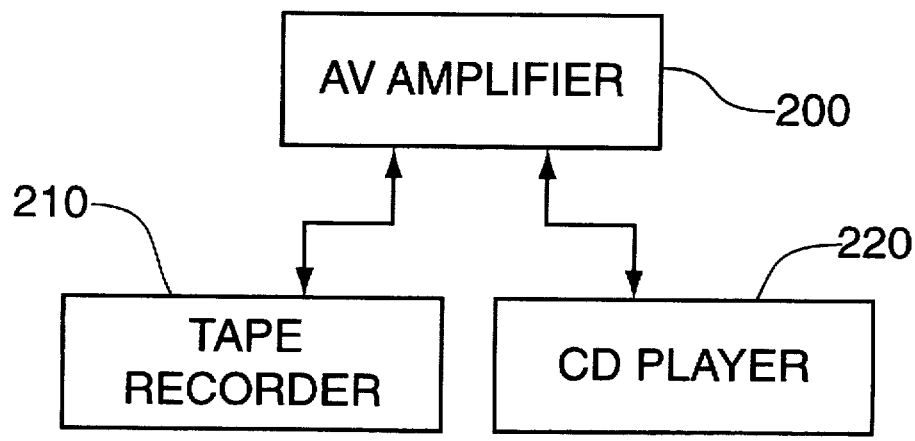
FIG. 5 is a block diagram of an AV system comprising a plurality of audio component devices.

FIG. 5 shows in block form an AV system comprising a plurality of audio component devices. In FIG. 5, audio component devices including a tape recorder 210 and a compact disc player 220 are connected to an AV amplifier 200 as an AV center.

Figure 6:
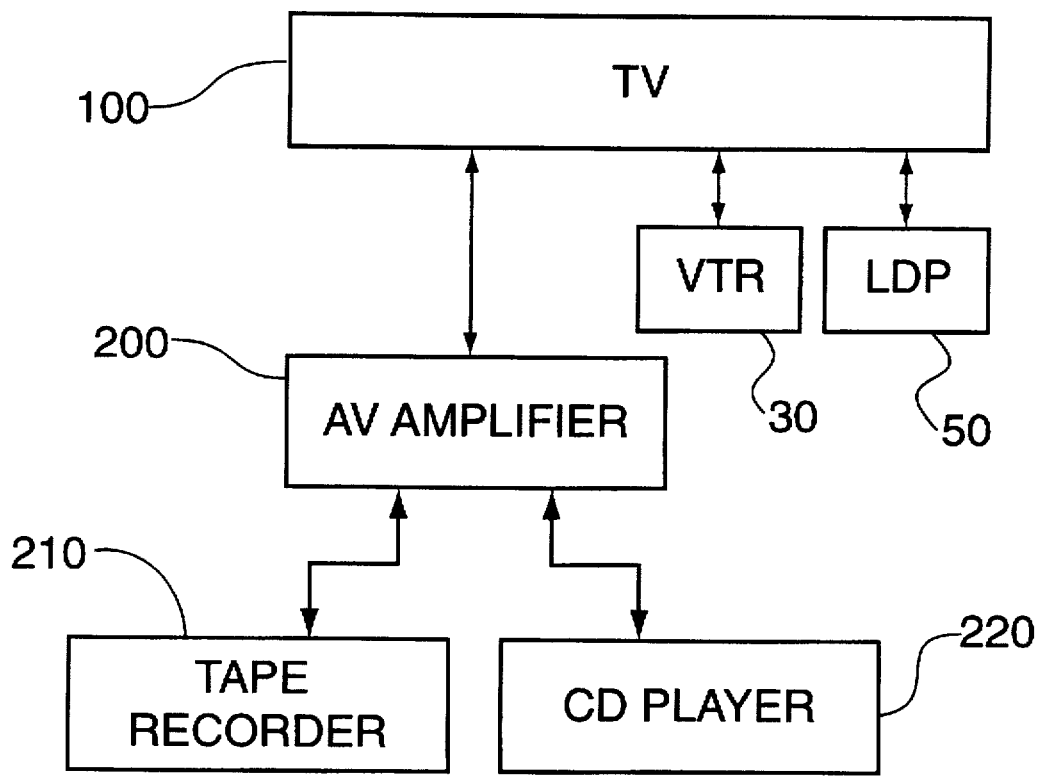
FIG. 6 is a block diagram of an AV system comprising the AV system shown in FIG. 5 and a TV set, a VTR, and an LDP added thereto.

FIG. 6 shows in block form an AV system which includes the AV system shown in FIG. 5 and the TV set, the VTR, and the LDP added thereto. Specifically, the VTR 30 and the LDP 50 are connected to the TV set 100 as an AV center, and the AV amplifier 200 is connected as an auxiliary AV center to the AV center 100. The auxiliary AV center 200 holds information (first layer) with respect to those devices which are connected directly thereto, and can perform the features of the devices connected directly thereto without referring to information in the host AV center.

Figure 7:
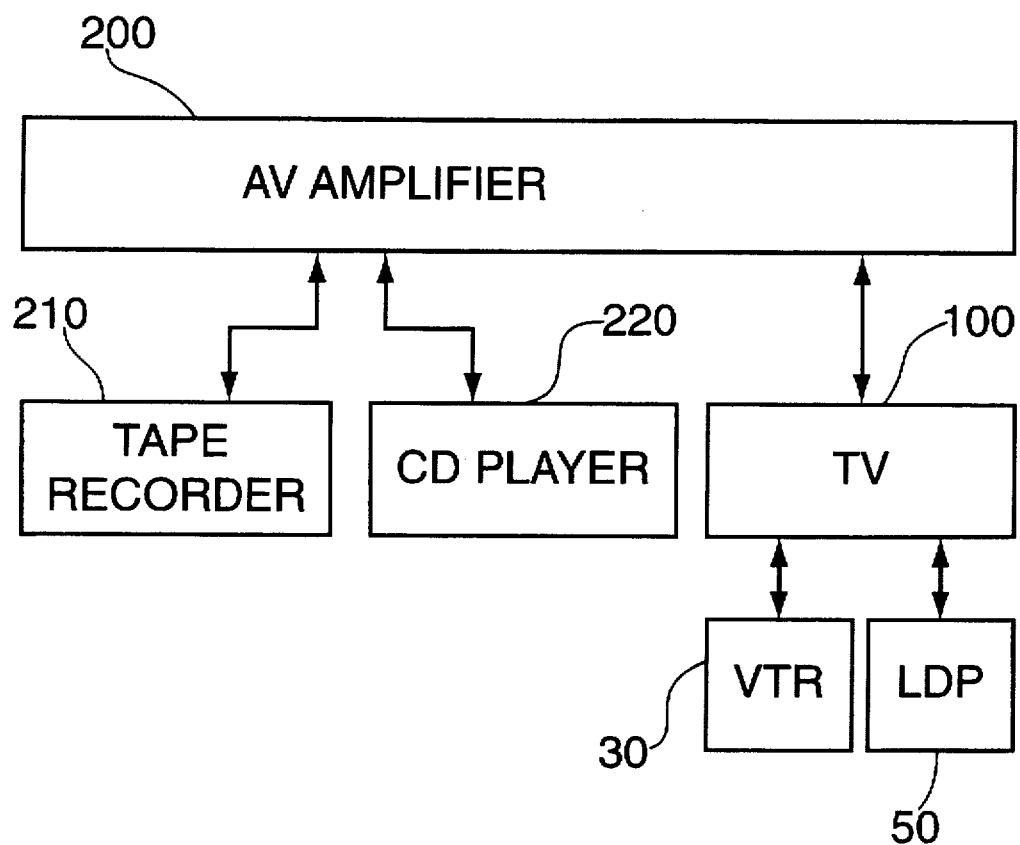
FIG. 7 is a block diagram of another AV system comprising the AV system shown in FIG. 5 and a TV set, a VTR, and an LDP added thereto.

FIG. 7 shows in block form another AV system which includes the AV system shown in FIG. 5 and the TV set, the VTR, and the LDP added thereto. Specifically, the AV amplifier 200 serves as an AV center, and the TV set 100 is connected as an auxiliary AV center to the AV amplifier 200, with the VTR 30 and the LDP 50 being connected thereto.

Figure 8:
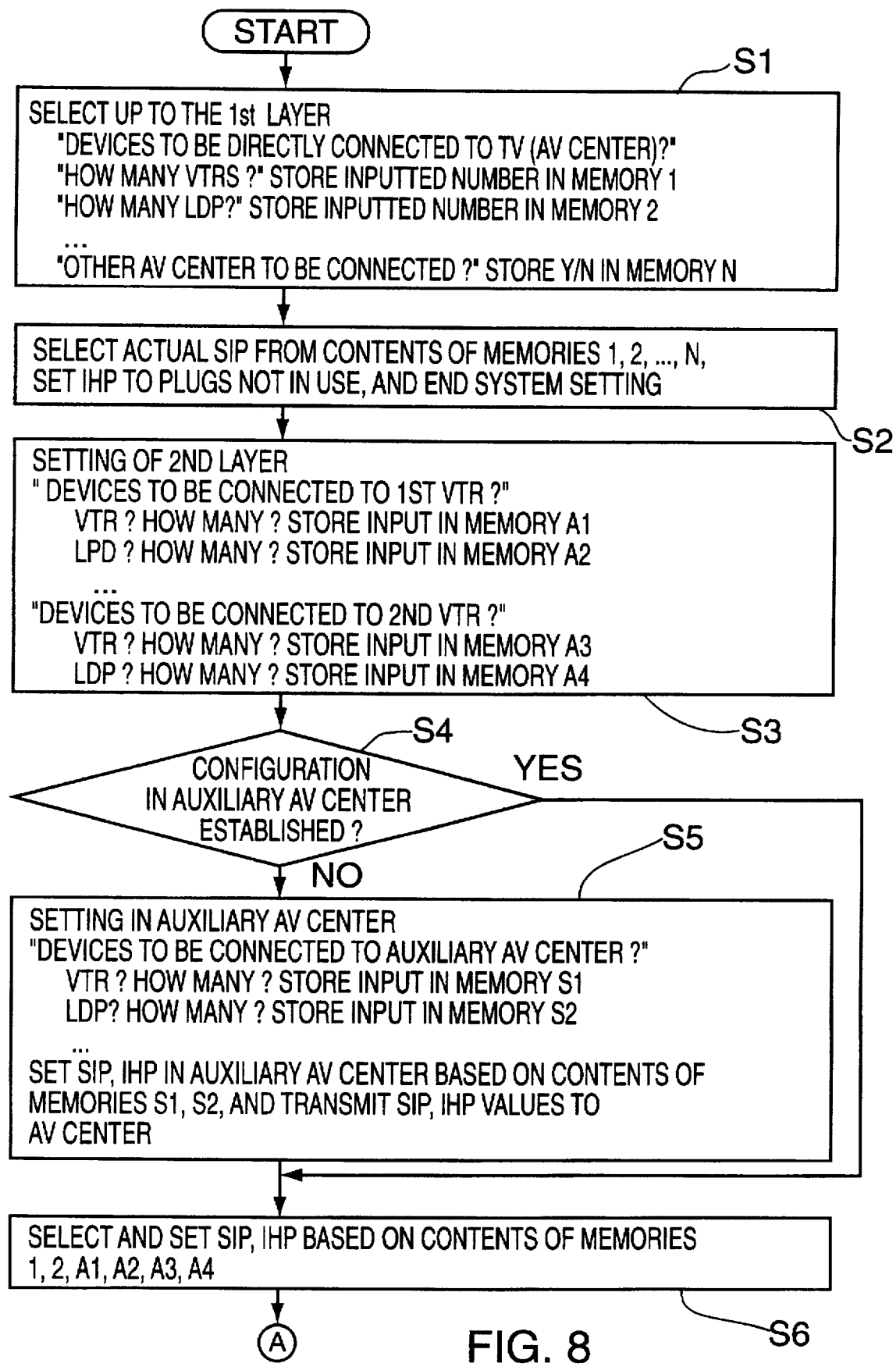
FIG. 8 is a flowchart of a portion of a method of establishing a connection setting according to the present invention.
Figure 9:
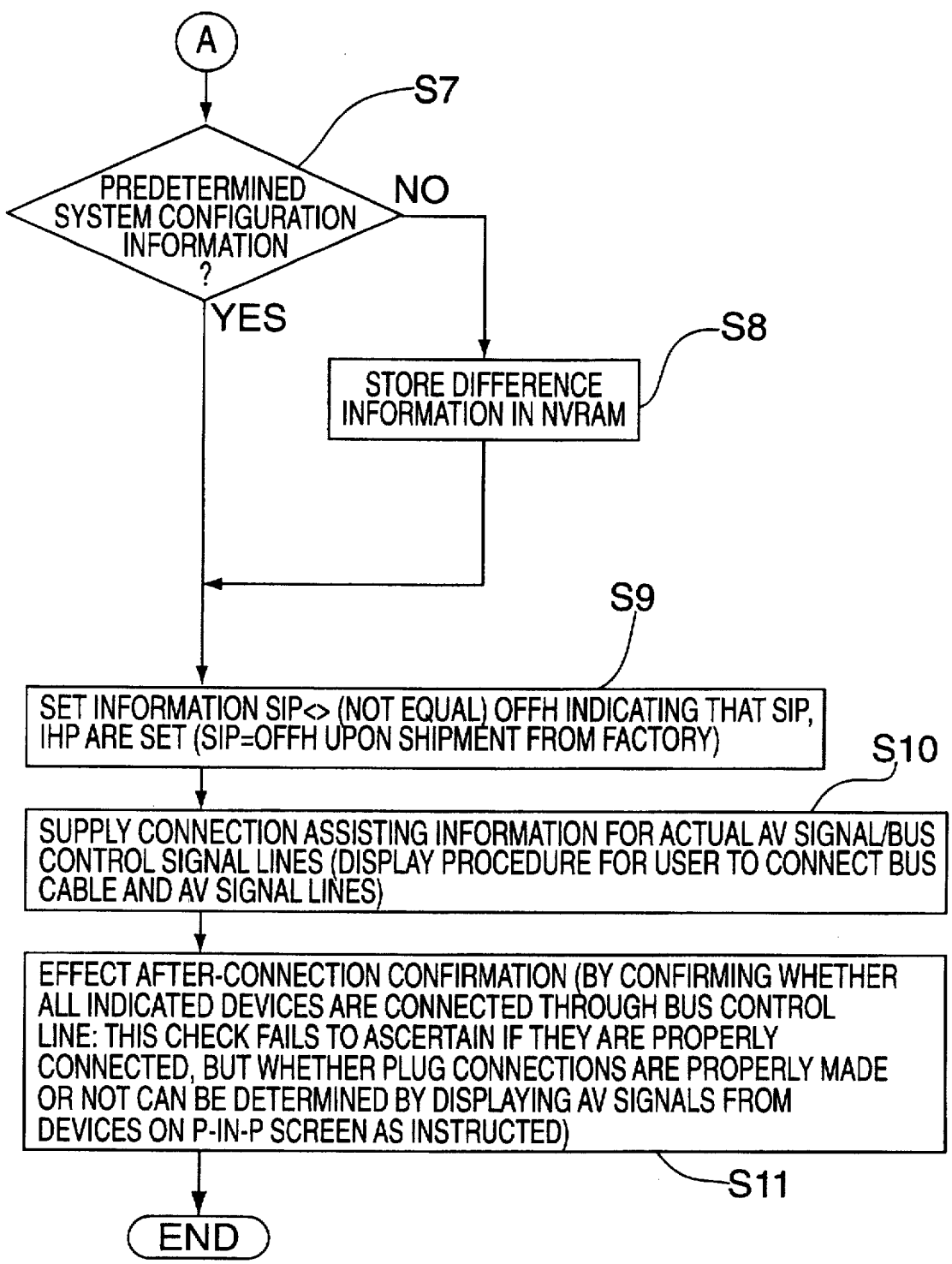
FIG. 9 is a flowchart of the remainder of the method of establishing a connection setting according to the present invention.

FIGS. 8 and 9 form a flowchart of a method of establishing a connection setting for the AV system. The microcomputer 9 controls the screen display IC 14 to display a menu or message on the CRT 13 to ask the user to select the component devices that the user wants to be connected to the TV set 100 as the AV center, i.e., to ask the user the component devices to be connected in the first layer in a step S1. Specifically, the microcomputer 9 asks the user how many VTRs, LDPs, etc. are to be connected, asks the user if another AV center is to be connected, and stores the user's answers from the commander 12 in memories 1, 2, . . . , N. At this time, the names of the AV component devices to be connected may be entered by the user. The data may be entered using the control button 1, a mouse, a touch panel, or a track ball rather than the commander 12.

Then, the microcomputer 9 selects the actual SIP from the contents of the memories 1, 2, . . . , N, temporarily stores the selected SIP in the SIP memory 6A, determines the IHP corresponding to plugs not in use, and stores the determined IHP in the IHP memory 6C, thus finishing the connection setting for the first layer in a step S2.

If a configuration desired by the user is not stored in the system configuration information ROM 5A, then the AV center 100 is controlled to select a configuration as close to the desired configuration as possible, e.g., a configuration having only one different connection from the desired configuration.

Thereafter, the microcomputer 9 establishes a connection setting for a second layer. Specifically, the microcomputer 9 controls the screen display IC 14 to display a menu or message on the CRT 13 to ask the user to select the component devices that the user wants to be connected to the component devices which are connected to the AV center 100, i.e., to ask the user the component devices to be connected in a second layer in step S3. Specifically, the microcomputer 9 asks the user how many component devices are to be connected to the component devices that are connected to the AV center 100, e.g., the first VTR and the second VTR, and which component devices are to be connected, and stores the user's answers from the commander 12 in memories A1, A2, A3, A4 . . .

Then, the microcomputer 9 determines whether a configuration setting in the auxiliary AV center has already been established in step S4. If a configuration setting in the auxiliary AV center has already been established, then control jumps to step S6. If a configuration setting in the auxiliary AV center has not been established, then control proceeds to step S5.

In step S5, the microcomputer 9 controls the screen display IC 14 to display a menu or message on the CRT 13 to ask the user the component devices that the user wants to be connected to the auxiliary AV center and the number of such component devices, and stores the user's answers from the commander 12 in memories S1, S2, . . . . . Then, based on the contents of the memories S1, S2, . . . , the microcomputer 9 establishes the SIP for the auxiliary AV center and temporarily stores the SIP in the SIP memory 6A, determines the IHP corresponding to plugs not in use by the auxiliary AV center, temporarily stores the determined IHP in the IHP memory 6C, thereafter stores the SIP and the IHP in the nonvolatile memory 7, and transmits the set SIP and IHP values to the auxiliary AV center.

In the next step S6, the microcomputer 9 selects and sets the SIP and the IHP based on the contents of the memories 1, 2, . . . , A1, A2, A3, A4, . . . . Then, the microcomputer 9 determines whether or not a system configuration requested by the user is a predetermined system configuration, i.e., whether it is represented by the system configuration information stored in the ROM 5A, in step S7. If not the predetermined system configuration in step S7, the microcomputer stores the difference between the system configuration requested by the user and the predetermined system configuration in the difference information memory 6B, and also stores the contents thereof in the nonvolatile memory 7 in step S8.

In this embodiment, since plugs not in use are controlled by the IHP, only the other differences need to be stored. If no IHP is employed, then all the differences with the SIP are stored.

If the system configuration requested by the user is the predetermined system configuration (YES in step S7), or after the difference information is stored in the nonvolatile memory 7 in step S8, the microcomputer 9 sets information indicating that the SIP and the IHP have been set in step S9, and then supplies actual connection assisting information for the AV signal/bus signal control lines in step S10. Thereafter, the microcomputer 9 effects an after-connection confirmation process in a step S11.

Specifically, a setting SIP≠OFFH is made (SIP=OFFH upon shipment from the factory) in step S9. In step S10, a procedure for the user to connect the AV bus control lines 21 and the AV signal lines 31, 41, 51 is displayed on the CRT 13. The user sees the displayed procedure to easily connect the lines. In step S11, the microcomputer 9 confirms that all the indicated component devices have been connected through the bus control line. For example, a video signal (test signal) is outputted from each component device, and displayed as an entire image or a picture-in-picture (P-INP) on the CRT 13. Alternatively, an audio signal from each component device is outputted from the loudspeaker. The user can now determine whether each plug has been properly connected.

In the embodiment shown in FIGS. 8 and 9, since connections are selected in each of the layers, a selection in each layer is made from a relatively few combinations, making it easy for the user to establish a connection setting. As the overall system configuration is controlled based on the SIP in the AV center and the SIP in a lower layer, it can be controlled with less data than if raw connection information (individual direct connection information) were controlled.

If the system configuration requested by the user is a predetermined system configuration, then the plug information in the ROM indicated by the SIP is used (e.g., the SIP No. 8, SIP No. 9, or the like). If the system configuration information is not a predetermined system configuration information, then the difference information is stored in the nonvolatile memory 7. Such a condition occurs when the AV center has fewer jacks than the system configurations requested by the user. In such a case, a connection setting can be established by the SIP and the difference information (to which the IHP may be added).

With a conventional AV system, the connection information is controlled in only one layer because each component device grasps connection information from an adjacent component device. Therefore, when any of various features, e.g., a one-touch playback feature (when one button of one component device is operated, all other related component devices are automatically operated), is to be performed, the component device which effects the feature has to complete the overall connections. Since each component device grasps connection information from an adjacent component device, if the final component for performing the feature is connected before an adjacent component device, a connection command needs to be propagated, i.e., a connection command for an adjacent component device is propagated successively through component devices until it reaches the final component device, in order to complete the connections.

The AV system according to this embodiment is constructed around the AV center which holds all the system configuration information for allowing a connection setting to be established with each of the component devices without successively transmitting connection commands to the bus when a feature is performed.

With such an arrangement, since the system configuration information controlled by the AV center is increased, the system configurations are controlled based on the SIP according to this embodiment. If indefinite system configurations are permitted, since the AV center undergoes an increased storage and control burden, it is preferable to limit the maximum number of controlled layers to a realistic level to achieve an overall balanced condition with respect to the amount of information processed, the amount of data stored, and the number of combinations that can be controlled.

Specifically, predetermined system configurations, i.e., the SIP, are arranged in two layers, and even when a relatively large AV system is considered, an arrangement in which the number of AV terminals of the AV center is increased to complete the system in one layer as much as possible is provided, and may be indicated with the SIP. Any expansion may be limited to system arrangements within a range of system configurations in which one AV center is included.

When the user requests a system including an AV center, a pointer to the plug connection information table may be defined at the "POINTER TO EXT-AUXILIARY AV CENTER INFORMATION TABLE" of the system connection information developed with the basic SIP as shown in FIGS. 3 and 4.

In this embodiment, if a system configuration corresponding precisely to a desired system configuration is not requested, then a system configuration (including the desired system configuration) more comprehensive than the desired system configuration is selected, and AV component devices are connected to respective plugs. Plugs not in use (excessive plugs) are controlled by the IHP. With this arrangement, the AV center can perform a desired operation. Specifically, when a reproduced video signal from the VTR 1 is to be dubbed into the VTR 2, even if other plugs not related to the dubbing operation are not in use, the AV center can carry out the dubbing operation while ignoring the existence of the plugs not in use insofar as the VTRs 1, 2 are connected to plugs of the AV center.

Figure 10:
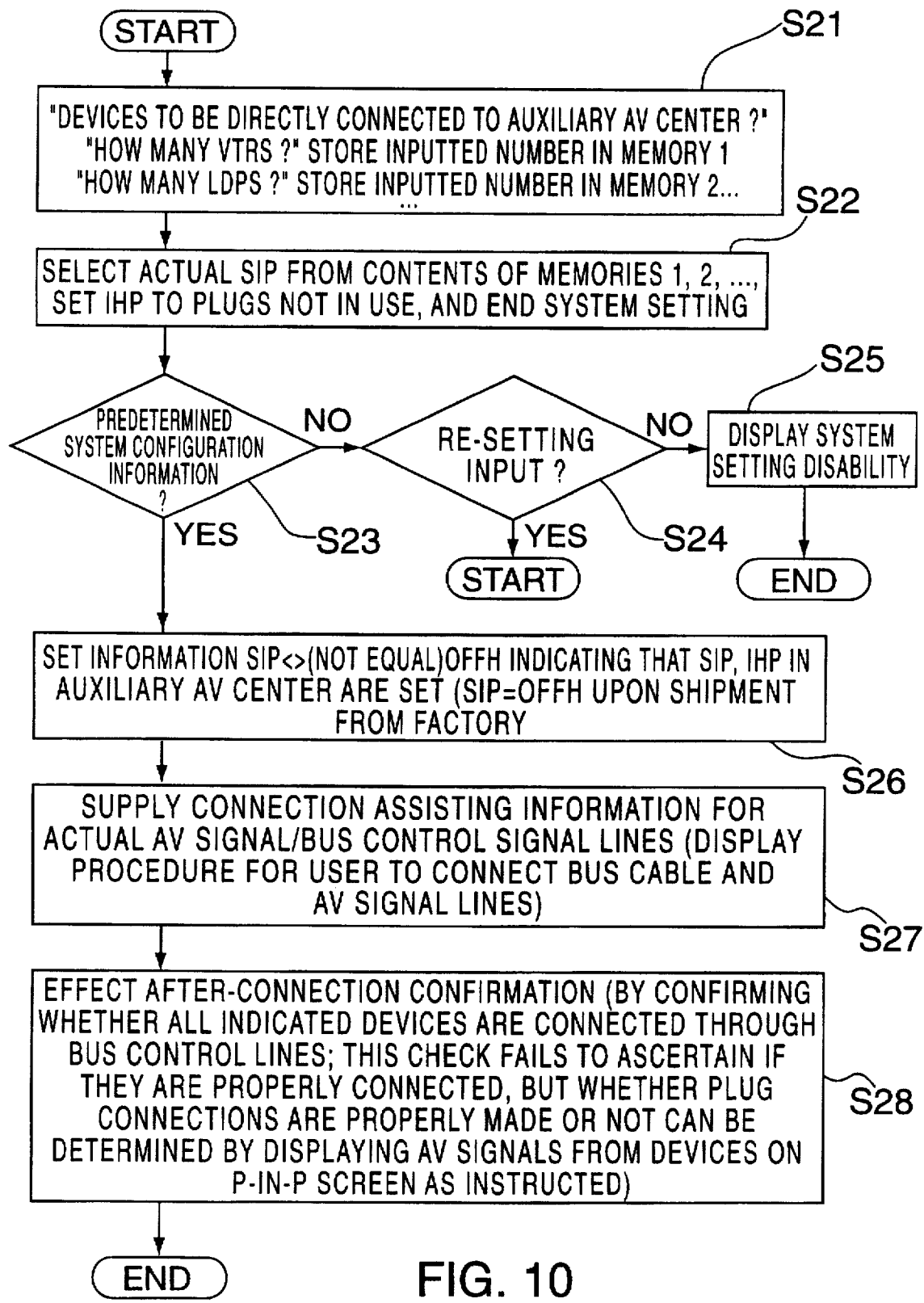
FIG. 10 is a flowchart of a process of establishing a system in an auxiliary AV center in order to facilitate the setting up of the system by using the auxiliary AV center.

FIG. 10 shows a process of establishing a system in an auxiliary AV center in order to facilitate the setting up of the system with an auxiliary AV center. The microcomputer for AV bus control in the auxiliary AV center displays a menu or message to ask the user the component devices which the user wants to be connected to the auxiliary AV center and the number of the component devices, and stores the user's answers in the memories 1, 2, . . . in step S21.

Then, the microcomputer for AV bus control selects the actual SIP from the contents of the memories 1, 2, . . . , temporarily stores the selected SIP in the SIP memory, sets the IHP corresponding to plugs not in use, temporarily stores the set IHP in the IHP memory, and thereafter stores the SIP and the IHP in the nonvolatile memory, thus finishing the connection setting in step S22.

Then, the microcomputer for AV bus control determines whether or not the system configuration requested by the user is a predetermined system configuration in step S23. If not a predetermined system configuration in step S23, and if there is an input to set a system configuration again (YES in step S24), then control goes back to START in FIG. 10. If there is no input to set a system configuration again, then a system setting disability is displayed in step S25 and control goes to an end.

If the system configuration requested by the user is predetermined system configuration (YES in step S23), the microcomputer for AV bus control sets information indicating that the SIP and the IHP have been set in step S26, and then supplies actual connection assisting information for the AV signal/bus signal control lines in step S27. Thereafter, the microcomputer for AV bus control effects an after-connection confirmation process in step S28. The steps S26 through S28 are the same as steps S9 through S11 shown in FIG. 9.

Figure 11:
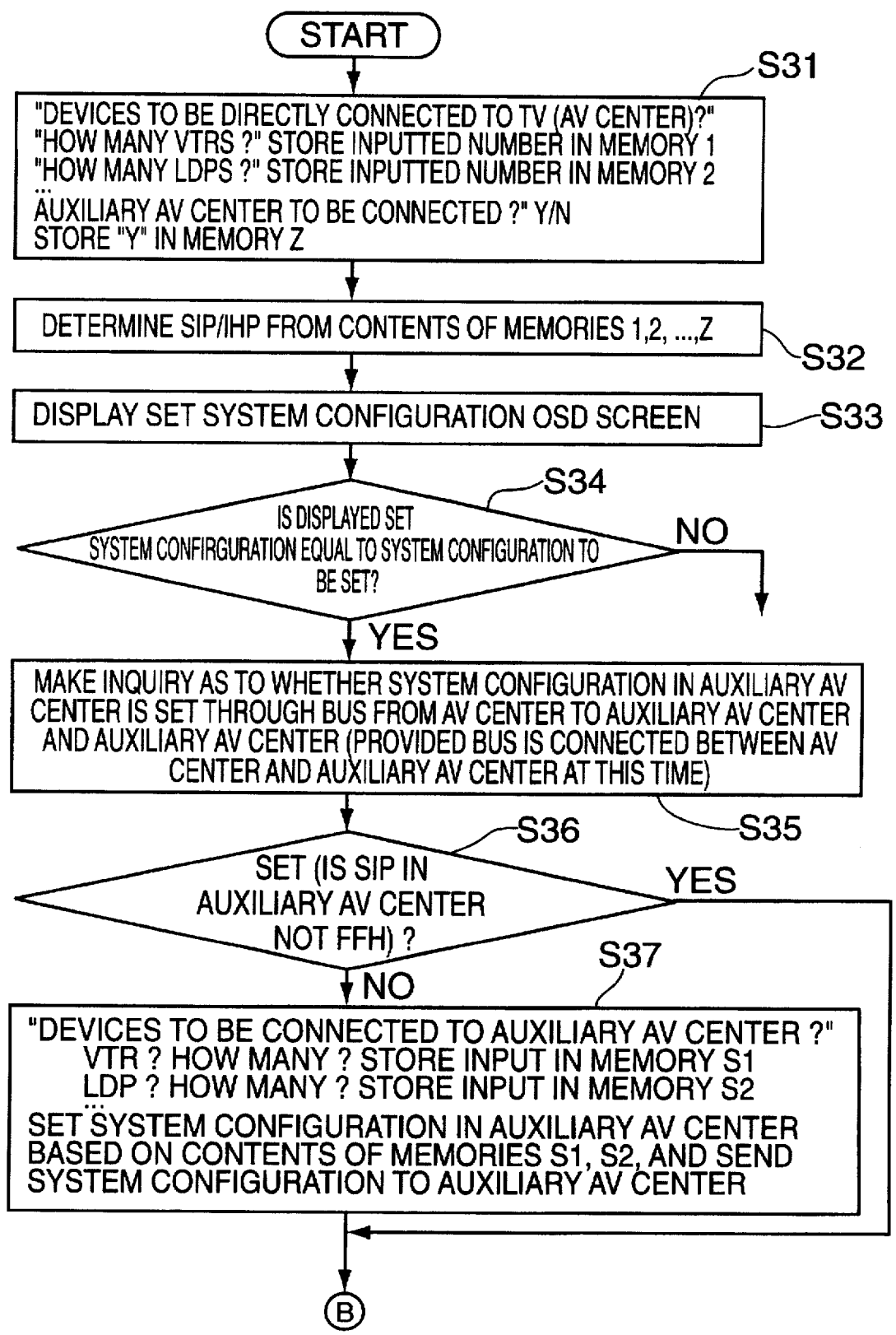
FIG. 11 is a flowchart of a portion of a process of establishing a system in an AV center in order to facilitate the setting up of the system by using an auxiliary AV center.
Figure 12:
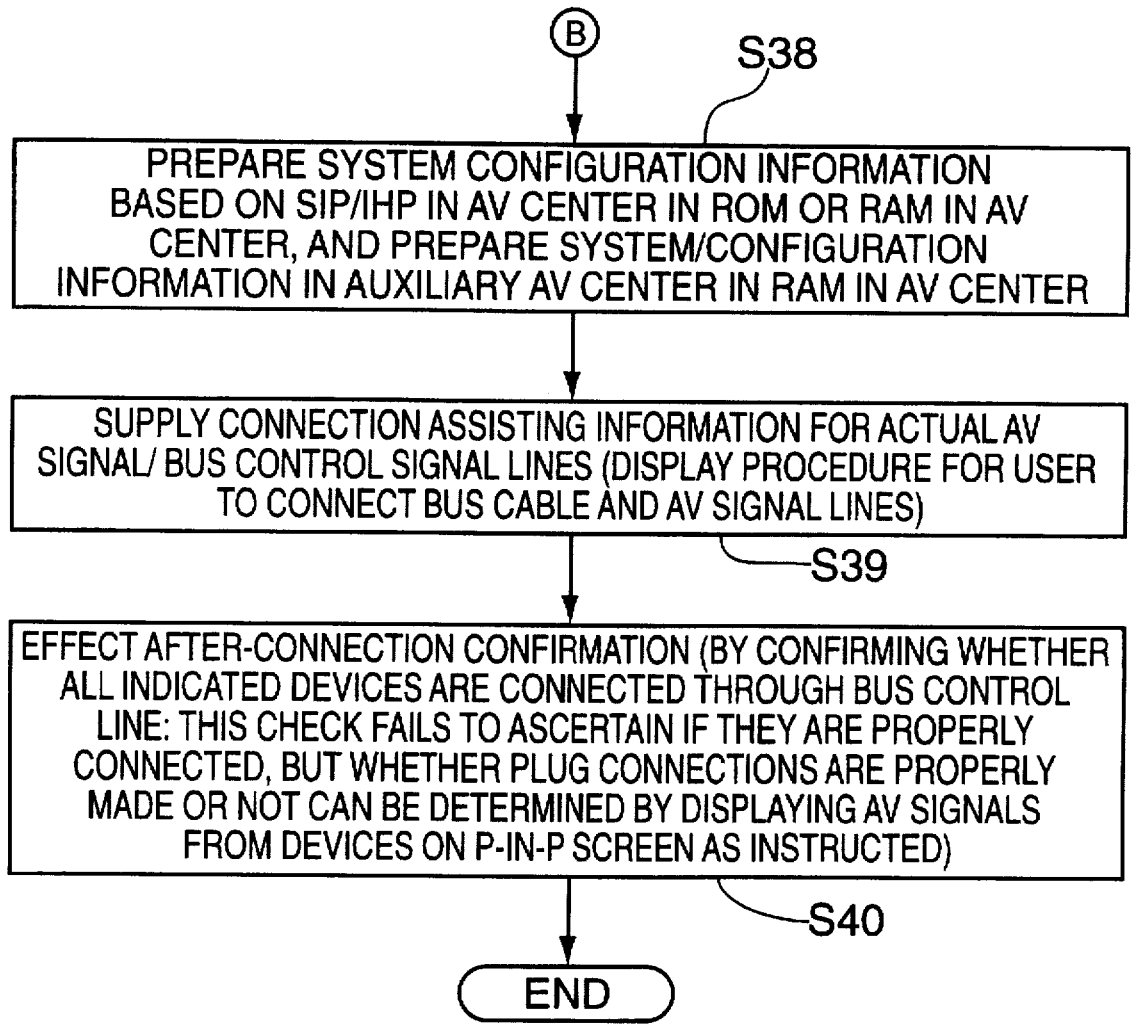
FIG. 12 is a flowchart of the remainder of the process of establishing a system in an AV center in order to facilitate the setting up of the system by using an auxiliary AV center.

FIGS. 11 and 12 show a process of establishing a system in the AV center in order to facilitate the setting up of the system by using an auxiliary AV center. The microcomputer 9 for AV bus control controls the screen display IC 14 to display a menu or message on the CRT 13 to ask the user the component devices that the user wants to be connected to the TV set 100 as the AV center in step S31. Specifically, the microcomputer 9 asks the user how many VTRs, LDPs, etc. are to be connected, asks the user if an auxiliary AV center is to be connected, and stores the user's answers from the commander 12 in memories 1, 2, . . . , Z.

Then, the microcomputer 9 selects the actual SIP from the contents of the memories 1, 2, . . . , Z, temporarily stores the selected SIP in the SIP memory 6A, sets the IHP corresponding to plugs not in use, and stores the set IHP in the IHP memory 6C in step S32. The microcomputer 9 then controls the screen display IC 14 to display the established system configuration on the CRT 13 in step S33.

Then, if the displayed system configuration is the same as the system configuration that the user has requested (YES in step S34), the microcomputer 9 asks the auxiliary AV center through the AV bus to determine whether a system configuration has been established in the auxiliary AV center in step S35. If a system configuration has been established, then control jumps to step S38. If not, then control goes to step S37.

In step S37, the microcomputer 9 controls the screen display IC 14 to display a menu or message on the CRT 13 to ask the user the component devices that the user wants to be connected to the auxiliary AV center and the number of such component devices, and stores the user's answers from the commander 12 in the memories S1, S2, . . . . Then, based on the contents of the memories S1, S2, . . . , the microcomputer 9 establishes the SIP and temporarily stores the SIP in the SIP memory 6A, sets the IHP corresponding to plugs not in use of the auxiliary AV center, temporarily stores the set IHP in the IHP memory 6C, thereafter stores the SIP and the IHP in the nonvolatile memory 7, and transmits the set SIP and IHP values to the auxiliary AV center.

In step S38, the microcomputer 9 prepares system configuration information based on the SIP and IHP for the AV center in the RAM 6, and also prepares system configuration information for the auxiliary AV center in the RAM 6. Then, the microcomputer 9 supplies actual connection assisting information for the AV signal/bus signal control lines in step S39, and effects an after-connection confirmation process in step S40.

Since the auxiliary AV center is employed, it is not necessary to establish, all over again, the system configuration that has been in use so far, and it is possible to establish a newly added system as a host system in addition to the system that has been in use so far (with the new system as the AV center and the system in use so far as an auxiliary AV center), or to establish a newly added system as a slave system in addition to the system that has been in use so far (with the new system as an auxiliary AV center and the system in use so far as the AV center).

For example, a two-figure value in the SIP in the AV center may be used for a configuration with no auxiliary AV center connected, and a three-figure value (with 1 added to a figure position (100s) higher than a two-figure position) may be used for a configuration with one auxiliary AV center connected.

When the user establishes a system configuration in combination with an auxiliary AV center, it is preferable that the auxiliary AV center have a function of setting the SIP and that component devices be connected thereto in one layer. When the user establishes that there is an auxiliary AV center while an AV center is being established, three-figure value is set as the SIP, for example. When a connection setting is made with the SIP and the IHP, since it can be established as having an auxiliary AV center connected, all connections can be set with a three-figure SIP. Thus, two-figure values in the SIP definition may be used to define other combinations.

Figure 13:
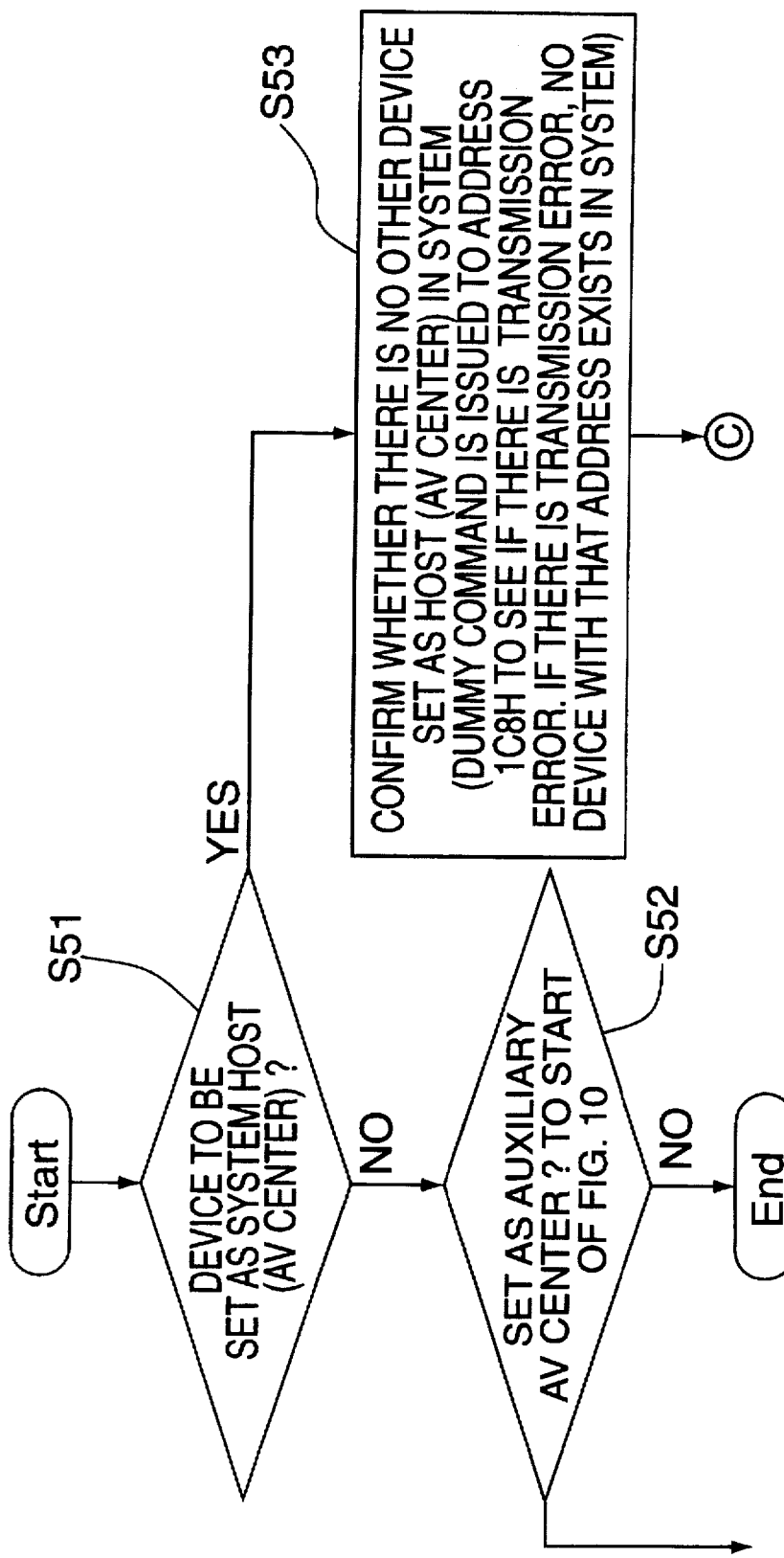
FIG. 13 is a flowchart of a portion of a process of establishing an AV center.
Figure 14:
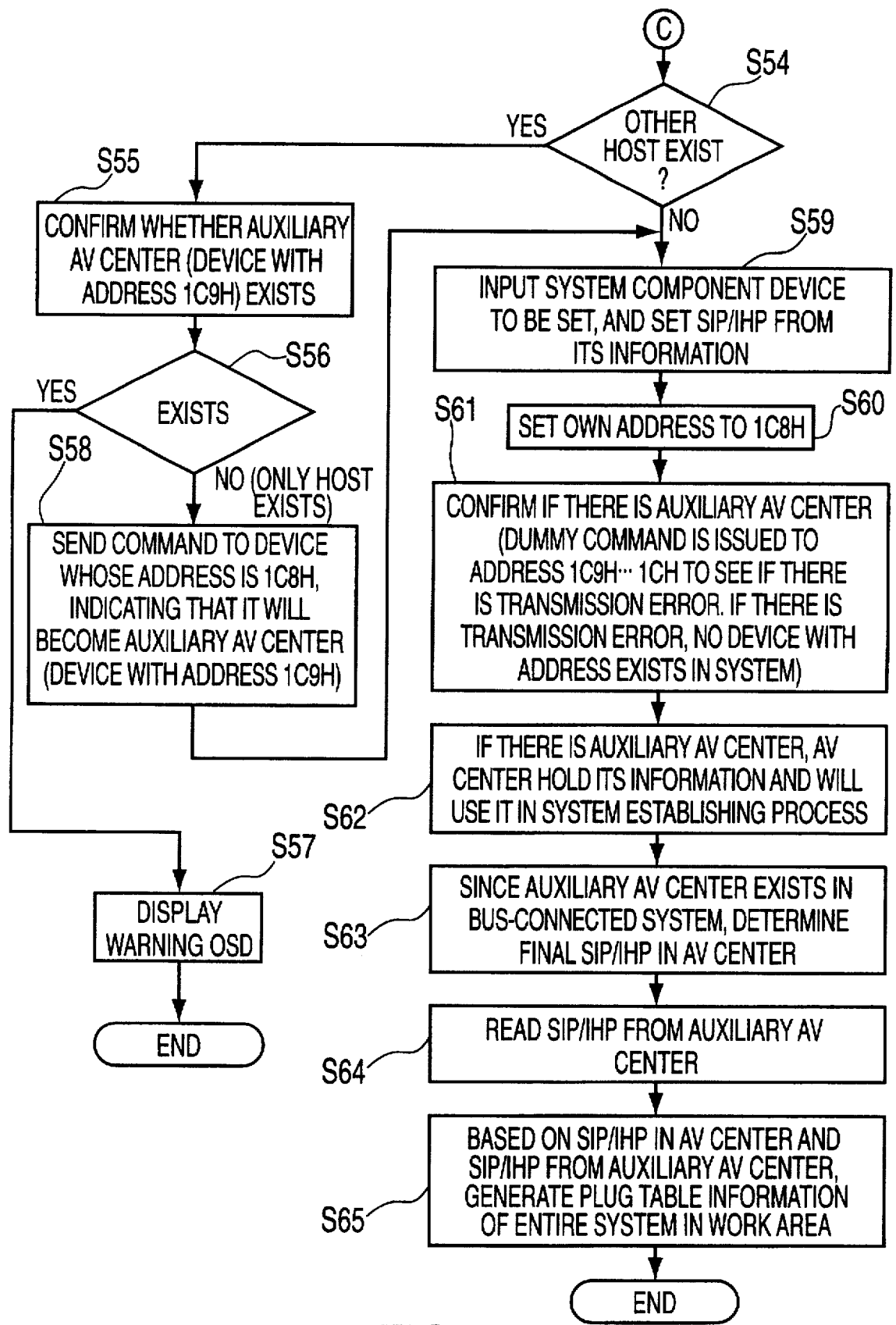
FIG. 14 is a flowchart of the remainder of the process of establishing an AV center.

FIGS. 13 and 14 show a process of establishing an AV center. It is assumed in this process that component devices including an auxiliary AV center are connected to the AV bus, and the component devices are turned on. The microcomputer for AV bus control displays a menu or message to ask the user if the component device is to be established as a host, i.e., an AV center, of the system in step S51. If the component device is not to be established as an AV center, then the microcomputer displays a menu or message to ask the user if the component device is to be established as an auxiliary AV center in step S52. If the component device is not to be established as an auxiliary AV center, then control ends. If the component device is to be established as an auxiliary AV center, then the microcomputer for AV bus control of the component device executes the process shown in FIG. 10.

If the component device is to be established as an AV center in step S51, then the microcomputer 9 for AV bus control checks whether there is any other component device that is established as an AV center in the system in step S53. Specifically, the microcomputer 9 for AV bus control sends a dummy command to an address 1C8H (which is the address of an AV center). If a transmission error occurs, then there is no other AV center in the system.

If there is another host or AV center (YES in step S54), then the microcomputer 9 for AV bus control checks whether there exists another auxiliary AV center (component device whose address is 1C9H) or not in step S55. If another auxiliary AV center exists (YES in a step S56), then, since there are a plurality of auxiliary AV centers, the microcomputer 9 for AV bus control displays a warning on the CRT 13 in step S57.

If no other auxiliary AV center exists in step S56, then the microcomputer 9 for AV bus control transmits a command to another AV center whose address is 1C8H, indicating that the other AV center will become an auxiliary AV center (component device whose address is 1C9H) (become a slave, not a host) in step S58. In this manner, the other AV center changes to an auxiliary AV center.

If there is no other AV center (NO in step S54), or after step S58, the microcomputer 9 for AV bus control prompts the use to enter a desired system configuration, and sets the SIP and the IHP based on the system configuration information inputted by the user in step S59. The microcomputer 9 for AV bus control sets its own address to 1C8H (host), establishing itself as an AV center in step S60. Then, the microcomputer 9 for AV bus control confirms whether there is established another auxiliary AV center in step S61. If there is another auxiliary AV center, then the AV center, i.e., the microcomputer 9 for AV bus control in the component device keeps the information indicative of the other auxiliary AV center, and will use it in a system establishing process in step S62. Since whether there is an auxiliary AV center or not within the bus-connected system has been determined, the microcomputer 9 for AV bus control sets the SIP and the IHP in the AV center in step S63.

Then, the microcomputer 9 for AV bus control in the component device or the AV center reads the SIP and the IHP from the auxiliary AV center in step S64, and generates plug table information (system configuration) of the entire system in a work region based on the SIP and the IHP that have been read from the avxf.v. and the SIP and the IHP in the AV center in step S65.

Figure 15:
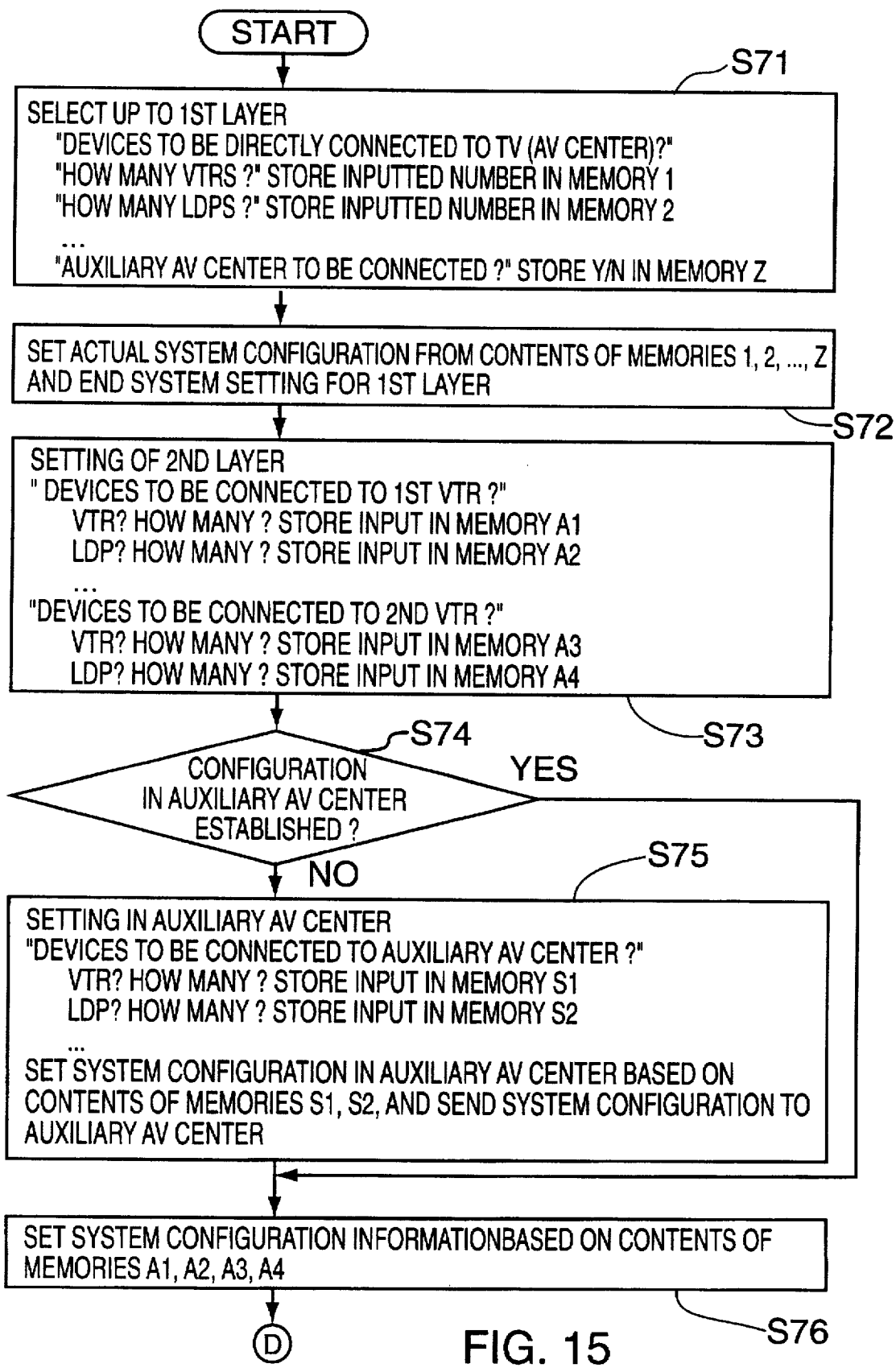
FIG. 15 is a flowchart of a portion of a process of keeping selected system connection information as it is.
Figure 16:
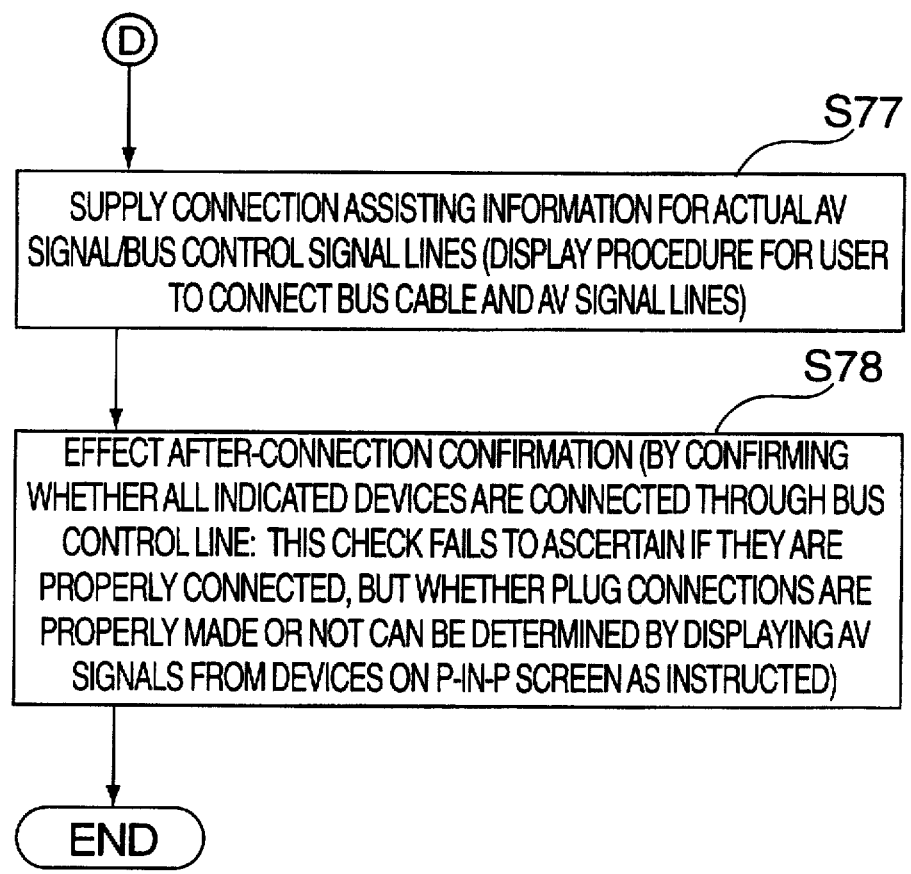
FIG. 16 is a flowchart of the remainder of the process of keeping selected system connection information as it is.

FIGS. 15 and 16 show a process of keeping selected system connection information as it is. The microcomputer 9 causes the screen display IC 14 to display a menu or message on the CRT 13 to ask the user which component devices the user wants to connect to the TV set 100 as the AV center, i.e., to ask the user the component devices to connect in a first layer, in step S71. Specifically, the microcomputer 9 asks the user how many VTRs, LDPs, etc. are to be connected, asks the user if an auxiliary AV center is to be connected, and stores the user's answers from the commander 12 in the memories 1, 2, . . . , Z.

Then, the microcomputer 9 selects the actual system configuration from the contents of the memories 1, 2, . . . , Z, and stores it in the memory, thus finishing the system connection setting for the first layer in step S72.

Thereafter, the microcomputer 9 establishes a connection setting for a second layer. Specifically, the microcomputer 9 causes the screen display IC 14 to display a menu or message on the CRT 13 to ask the user which component devices the user wants to connect to the component devices which are connected to the AV center 100, i.e. to ask the user which component devices to connect in a second layer in step S73. Specifically, the microcomputer 9 asks the user how many component devices are to be connected to the component devices that are connected to the AV center 100, e.g., the first VTR and the second VTR, and which component devices are to be connected, and stores the user's answers from the commander 12 in the memories A1, A2, A3, A4 . . . .

Then, the microcomputer 9 determines whether a configuration setting in the auxiliary AV center has already been established or not in step S74. If a configuration setting in the auxiliary AV center has already been established, then control jumps to a step S76. If a configuration setting in the auxiliary AV center has not been established, then control proceeds to step S75.

In step S75, the microcomputer 9 causes the screen display IC 14 to display a menu or message on the CRT 13 asking the user which component devices the user wants to connect to the auxiliary AV center and the number of such component devices, and stores the user's answers from the commander 12 in the memories S1, S2, . . . . Then, based on the contents of the memories S1, S2, . . . , the microcomputer 9 establishes a system configuration for the auxiliary AV center and transmits the system configuration information to the auxiliary AV center.

In the next step S76, the microcomputer 9 sets system configuration information based on the contents of the memories A1, A2, A3, A4, . . . . Then, the microcomputer 9 supplies actual connection assisting information for the AV signal/bus signal control lines in step S77. Thereafter, the microcomputer 9 effects an after-connection confirmation process in step S78.

If the component devices connected to the AV terminals of the component device and the numbers of their AV terminals are stored in the memory as shown in FIGS. 15 and 16, then a large memory area is required. If a nonvolatile memory (NVRAM) is used to protect stored system configuration information upon a power supply failure, then the cost is considerably large.

To solve the above problem, the overall connection information is determined based on information (difference information) about the difference between a predetermined system configuration information and an actual system configuration, thus reducing the storage capacity of the nonvolatile memory.

A smaller nonvolatile memory capacity may be sufficient if an actual system configuration can be represented by predetermined system configuration information. According to the present invention, there are required an NVRAM area for storing information indicative of whether there is difference information and an NVRAM for storing difference information itself.

To set the SIP and select the IHP, the following menus are successively displayed for the user to select system configuration information:

VTR to be connected ? Y/N

If YES, how many ? 1, 2, 3 ?

LDP to be connected ? Y/N

AAMP (audio amplifier) to be connected ? Y/N

VTU (video tuner) to be connected ? Y/N

If the AV center (TV) has many plugs, then a connection setting can be established relatively easily because no connections to a lower layer need to be considered. If the number of plugs is small, then it is necessary to consider connections to a lower layer, thereby making the selection process complex. It will be easier for the user to understand connection settings if an actual system configuration is displayed on the CRT 13 while a selection is being made.

For connection of component devices in a lower layer, the above menus are used to ask the user any component devices to be connected in a lower layer after Y/N. If there is such a component device in a lower layer, then it is selected. If a component device in a lower layer is an auxiliary AV center, then it is selected in a manner similar to a menu for establishing an auxiliary AV center.

Specifically, the number of component devices to be connected to the AV center is first inputted by the user, and if they cannot be connected in one layer with the maximum number of plugs that the AV center has, then the user is allowed to make a selection while a system configuration in a second layer is being displayed.

Figure 17A:
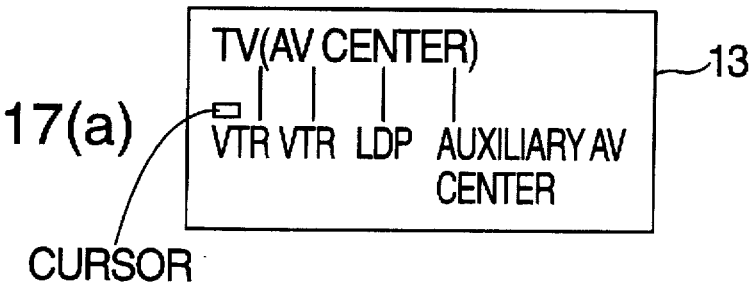
FIGS. 17(a), 17(b), and 17(c) are views showing, by way of example, displayed information for facilitating a connection setting to be made by the user.
Figure 17B:
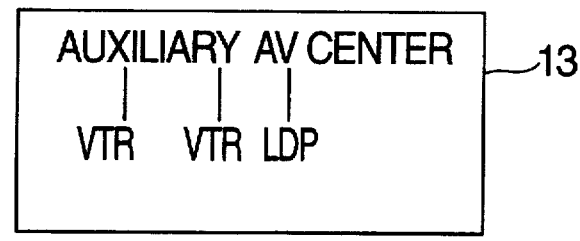
Figure 17C:
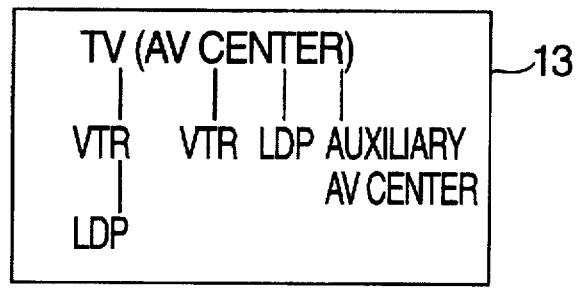

FIGS. 17(a), 17(b), and 17(c) show, by way of example, displayed information for facilitating a connection setting to be made by the user. The microcomputer 9 for AV bus control initially displays information shown in FIG. 17(a). In FIG. 17(a), the cursor is positioned at "VTR" on the leftmost end. The microcomputer 9 prompts the user to press a selection button which may be provided as the control button 1 of the TV set 100 or on the commander 12. When the user presses the selection button, with the cursor on the leftmost end, the display switches successively to "VTR", "LDP", "AUXILIARY AV CENTER", . . . . After setting the leftmost end, the cursor is moved to "VTR" at the center, and the user presses the selection buttons to select "LDP", "AUXILIARY AV CENTER", . . . .

An auxiliary AV center may be established on the side of the auxiliary AV center, or may be established on the displayed screen shown in FIG. 17(a) and thereafter the information about the auxiliary AV center may be transmitted to the auxiliary AV center.

For establishing an auxiliary AV center, it may be established on the side of the auxiliary AV center, or it may be established on the displayed screen shown in FIG. 17(a), and after the auxiliary AV center is established, established information may be transferred to the auxiliary AV center.

If an auxiliary AV center is to be established on the displayed screen shown in FIG. 17(a), then information for establishing an auxiliary AV center as shown in FIG. 17(b) is displayed, and the auxiliary AV center is established in the same manner as described above. After the auxiliary AV center has been established, the established information is transferred to the auxiliary AV center in which the system configuration information that has existed in the auxiliary AV center is replaced by the transferred information. Therefore, it is preferable to confirm whether the existing system configuration information may be erased or not before the established information is transferred to the auxiliary AV center.

When a setting up of a second layer is selected, the displayed information changes from FIG. 17(a) to FIG. 17(b), and a connection setting for an LDP, for example, is carried out.

Heretofore, when the main power supply which has been turned off is turned on, it has been necessary to establish a system configuration again. Therefore, it has been customary to store system configuration information in a nonvolatile memory, and to restore the stored system configuration information from the nonvolatile memory when the main power supply is turned on.

If the system configuration information is stored (directly) as it is, then a large amount of information needs to be stored, and hence a storage capacity for storing the same is relatively large and costly. According to the present invention, the amount of information to be stored in the nonvolatile memory is reduced by using the SIP. With the SIP, the system configuration information is not stored as it is, but the pointer to the system configuration information is stored. Therefore, the storage capacity for storing necessary information is reduced.

Inasmuch as a reduced amount of information is required to be controlled, it is not necessary to employ a dedicated nonvolatile memory as is the case with the conventional system, but it is sufficient to use a portion of a channel-selection nonvolatile memory which is originally equipped in a TV set or the like.

Any control information which is indicative of whether such a nonvolatile memory has already been set up or has not been set up and is to be set up by the user is also reduced and hence can be controlled relatively easily.

As shown in FIG. 17, if some of the system configurations (which satisfies input conditions from the user) stored in the system configuration information ROM 5A are displayed on the CRT 13 for the user to select one of the displayed system configurations, then the selecting operation is facilitated. The system configurations may be displayed in the patterns shown in FIGS. 5 through 7.

Rather than displaying the system configurations stored in the system configuration information ROM 5A, they may be printed on instruction manuals accompanying the AV center and component devices for the user to select one of the system configurations.

Figure 18:
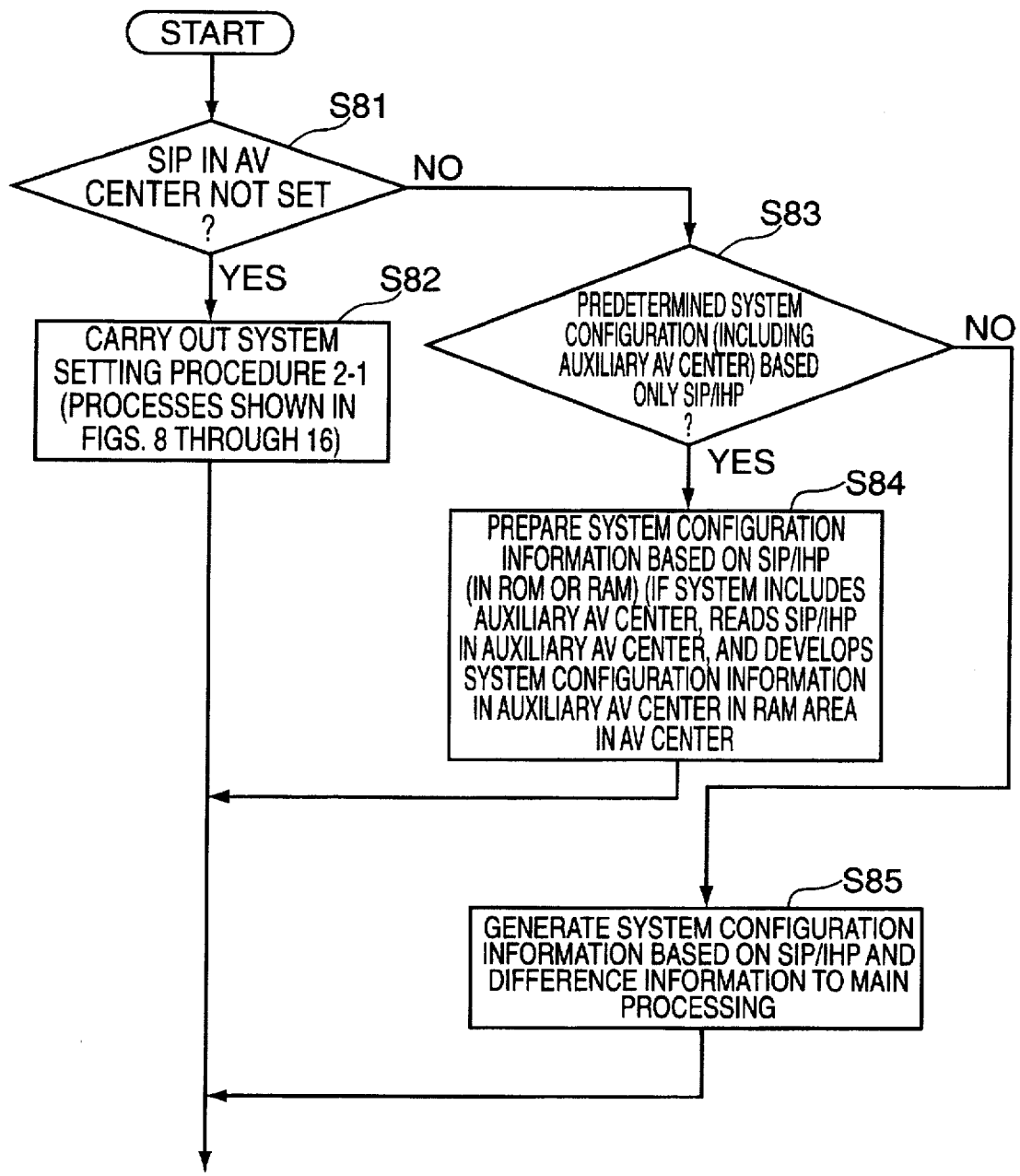

FIG. 18 shows a process of an operation sequence when the main power supply that has been turned off is turned on. If the SIP in the AV center is not established (YES in step S81), then the microcomputer 9 for AV bus control carries out the system setting shown in FIGS. 8 through 14 in step S82, and enters the main processing (processing which is usually carried out after the power supply is turned on).

If the SIP is established, the microcomputer 9 for AV bus control determines whether it is predetermined connection information composed of the SIP and the IHP in a step S83. If it is, then the microcomputer 9 reads system configuration information from the nonvolatile memory 7 based on the SIP and the IHP, develops it in the RAM 6 (if the system includes an auxiliary AV center, the microcomputer reads the SIP and the IHP from the auxiliary AV center, and develops system configuration information of the auxiliary AV center in the RAM in the AV center) in a step S84, and then enters the main processing.

If not the predetermined connection information composed of the SIP and the IHP in the step S83, then the microcomputer 9 generates system configuration information based on the difference information between the predetermined connection information based on the SIP and the IHP and the system configuration requested by the user in a step S85, and thereafter enters the main processing.

Use of the SIP and the IHP will be described below. The IHP is used to achieve an actual system configuration while reducing definitions of the SIP. For example, any definitions of the SIP at numbers (two-figure) lower than the 100 become unnecessary by using combinations of numbers (three-figure) higher than 100 and the IHP.

When combinations of the SIP and IHP are used, a setting up of a system configuration with fewer plugs than a default SIP pattern may be replaced with an SIP+IHP combination representing a larger system configuration, as indicated below:

SIPNO3 > SIPNO1
SIPNO4 > SIPNO1
SIPNO5 > SIPNO1
SIPNO6 > SIPNO1
SIPNO7 > SIPNO1
SIPNO8 > SIPNO1
SIPNO9 > SIPNO1
SIPNO4 > SIPNO2
SIPNO5 > SIPNO2
SIPNO6 > SIPNO2
SIPNO9 > SIPNO2
SIPNO5 > SIPNO3
SIPNO7 > SIPNO3
SIPNO9 > SIPNO3
SIPNO5 > SIPNO4
SIPNO9 > SIPNO4

(For example, SIPNO3>SIPNO1 indicates that the SIP structure of No. 3 contains the SIP structure of No. 1). Therefore, a ROM data table in the ROM 5A for storing predetermined system configuration information may be relatively small though an NVRAM area (an area of the nonvolatile memory 7) is required for storing the IHP. Since the IHP is 1 byte (8 bits) capable of monitoring the turning on and off (use/non-use) of 8 plugs, 4 bytes are required by the SIP and the IHP of an AV center and an auxiliary AV center. If the total number of plugs of an AV center and an auxiliary AV center is up to 8, then 3 bytes may be enough for the SIP and the IHP.

FIG. 19 shows many system configurations with one SIP each can be expressed with one SIP using a combination of the SIP and the IHP. For example, a system configuration with an original (with no IHP used) SIP No. 1 is a system configuration in which the TV has a single plug P1 and the VTR 1 is connected to the plug P1. If this system configuration is represented using the SIP and the IHP, then it can be represented by an SIP of No. 9 and an IHP of FEH. The IHP (hexadecimal notation) represents the first four (P8 through P5) of eight plugs P8, P7, P6, P5, P4, P3, P2, P1 with a second figure position, and the other four plugs (P4 through P1) with a first figure position. The plugs P8, P7, P6, P5 are not illustrated, and are represented by a binary notation of (1111) and a hexadecimal notation of (F) because they are not used. Since only plug P1 of the plugs P4, P3, P2, P1 is used, it is represented by a binary notation of (1110) and a hexadecimal notation of (E). Therefore, IHP is represented by FEH.

Similarly, a system configuration with an original SIP No. 7 is a system configuration in which the TV has three plugs P1, P2, P3 and the VTR 1 is connected to the plug P1, the VTR 2 to the plug P2, and the VTR 3 to the plug P3. If the system configuration is expressed using the SIP and the IHP, then since the plugs P8, P7, P6, P5 are not used, they are represented by (1111) (=F), and since the plugs P3, P2, P1 of the plugs P4, P3, P2, P1 are used, they are represented by (1000) (=8). Therefore, IHP is represented by F8H, and it can be expressed by the SIP No. 1 which is the same as the original SIP No. 1 (only IHP is different).

A system of a more complex system configuration can be handled with relatively simple control process and control data by distributing the burden between an auxiliary AV center and an AV center, as described below.

It is assumed that the address of an AV center is fixed to only one address 1C8H and the address of one auxiliary AV center is defined as 1C9H, the addresses of two auxiliary AV centers as 1C9H and 1CAH, and the addresses of three auxiliary AV centers as 1C9H, 1CAH, and 1CBH. The auxiliary AV center only supports up to layers of component devices directly connected to the auxiliary AV center. The auxiliary AV center stores a system configuration up to the layers directly connected thereto specifically with SIP/IHP values.

The connection is set up by the auxiliary AV center itself. The AV center may set up connection information for the auxiliary AV center. In such a case, the established information in the auxiliary AV center may be transmitted from the AV center and stored in the auxiliary AV center.

Switching between an AV center and an auxiliary AV center will be described below. That a TV set or the like does not use a component device address 100H but becomes an AV center having an address 1C8H is defined as follows: Any component device which can become an AV center has a function capable of establishing that it uses its own component device address (TV=100H, . . . , 107H) or it defines itself as an AV center (address 1C8H). When a TV set is defined as an AV center by the user, system configuration information has to be established in the TV set (AV center).

When a TV set is defined as an AV center, if an AV center is already in the system, i.e., if an AV amplifier is established as an AV center with bus signal lines connected, then a warning is displayed on the OSD of the TV set to be defined as an AV center. After the user has confirmed the displayed warning, the TV set is established as the AV center. At this time, the AV center that has existed so far becomes an auxiliary AV center, and it is confirmed whether the component devices connected to the auxiliary AV center are connected in a first layer, i.e., directly connected, or not by checking the SIP/IHP. Specifically, the new AV center sends a command indicating that the existing AV center will become an auxiliary AV center component device whose address is 1C8H, i.e., an AV amplifier, and thereafter changes its own address 1C8H.

The component device which has previously been the AV center and commanded to becomes an auxiliary AV center confirms whether an address 1C9H is already being used. If it is not being used, the address becomes the address of the auxiliary AV center. If already in use, the address is set to a higher address 1CAH, and checks whether the address 1CAH is already being used. The address is incremented by +1 from 1C9H up to a maximum address 1CFH so that seven AV centers can be defined on the system.

Figure 20:
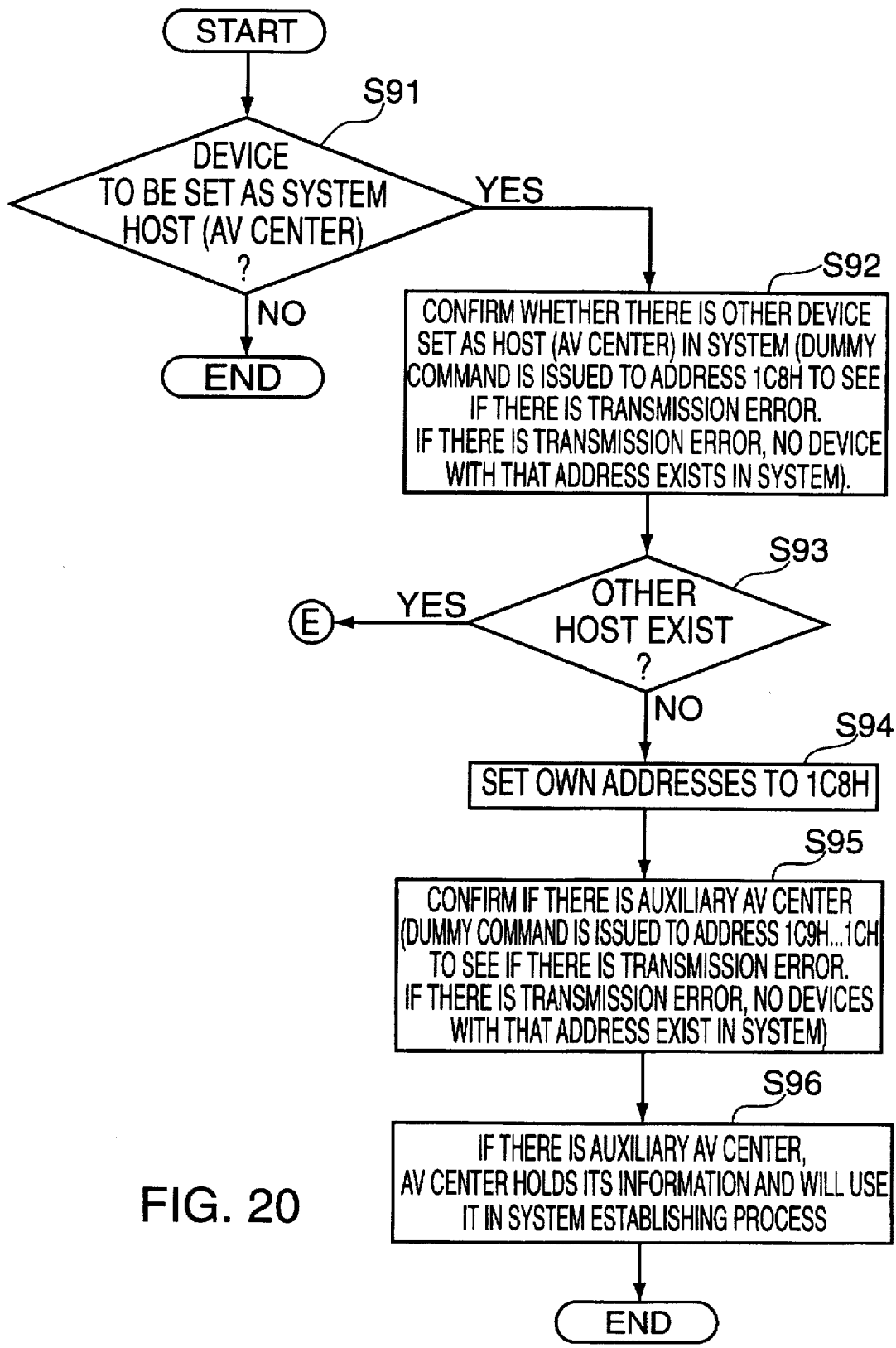
FIG. 20 is a flowchart of a portion of another process of establishing an AV center.
Figure 21:
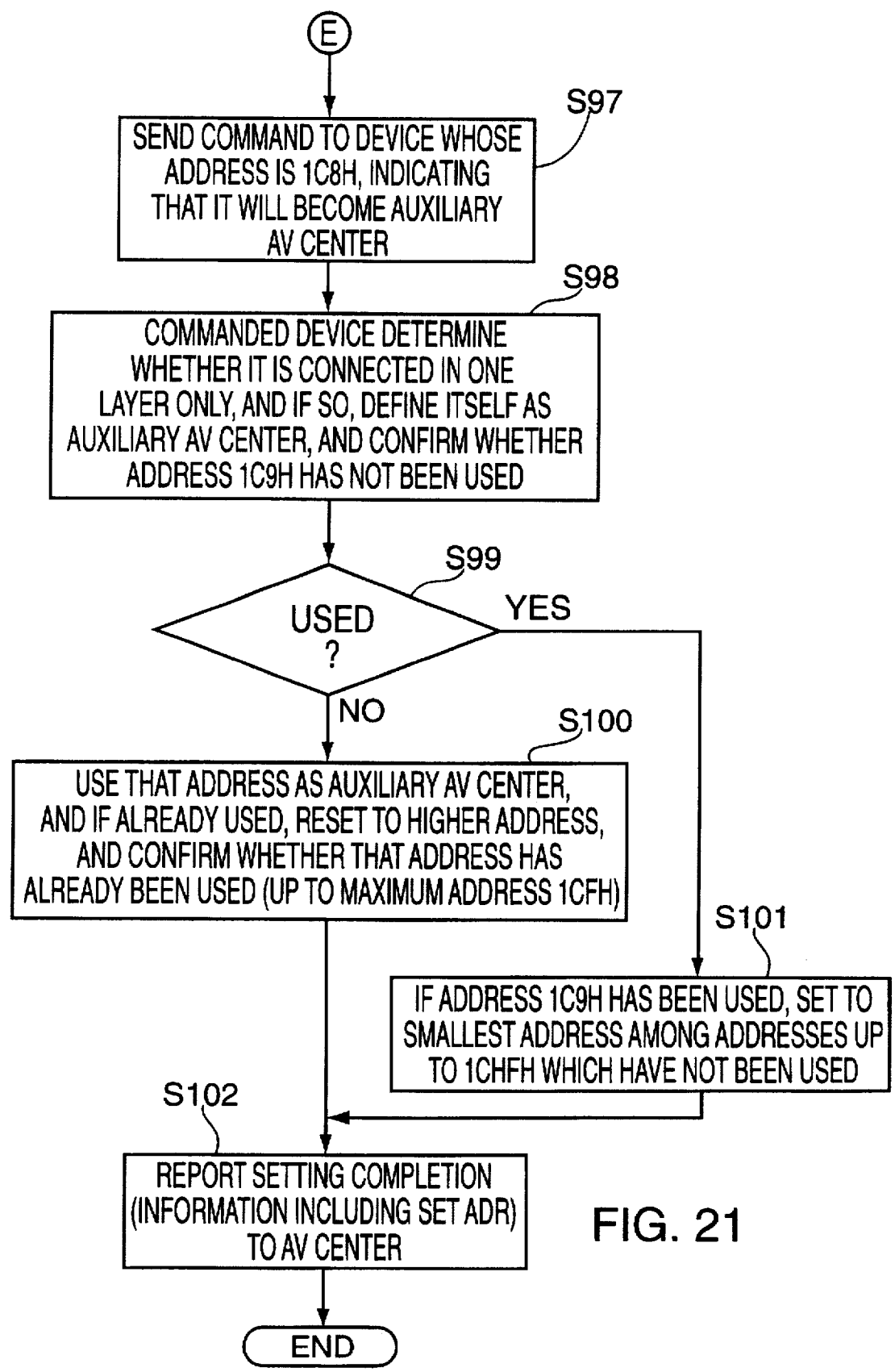
FIG. 21 is a flowchart of the remainder of the other process of establishing an AV center.

FIGS. 20 and 21 illustrate another process of establishing an AV center. The microcomputer 9 for AV bus control in a certain component device displays a menu or message to ask the user if the component device is to be established as a host, i.e., an AV center, of the system in a step S91. If the component device is not to be established as an AV center, then control ends.

If the component device is to be established as an AV center in the step S91, the microcomputer 9 determines whether there is another component device established as an AV center in the system in a step S92. Specifically, the microcomputer 9 sends a dummy command to an address 1C8H (which is the address of an AV center). If a transmission error occurs, then there is no other AV center in the system.

If there is no other host or AV center (NO in a step S93), then the microcomputer 9 sets the address of the component device to 1C8H to establish the component device as an AV center in a step S94. Then, the microcomputer 9 -determines whether there has been established another auxiliary AV center in a step S95. If another auxiliary AV center exists, then the microcomputer 9 in the AV center, i.e., the component device, holds the information indicating that another auxiliary AV center exists, and will use it in a system establishing process in a step S96.

If there is another host or AV center in the step S93, then the microcomputer 9 transmits a command to the other AV center whose address is 1C8H, indicating that the other AV center will become an auxiliary AV center (component device whose address is 1C9H) in a step S97.

The microcomputer 9 in the commanded component device determines whether it is connected up to a first layer or not. If so, then it is defined as an auxiliary AV center, and confirms whether the address 1C9H has been used or not in a step S98. If not used (NO in a step S99), then the address is used as the address of the auxiliary AV center in a step S100. If used, then the smallest address not used among the addresses up to 1CFH is used as the address of the auxiliary AV center in a step S101. Then, the completion of the setting of the auxiliary AV center, together with the set address information, is reported to the AV center in a step S102.

A process of establishing a system configuration (partly automatically) will be described below. If the user has one TV set and two VTRs and inputs TV(1)/VTR(2) on the initial system setting screen, the microcomputer 9 for AV bus control in the AV center selects SIPs satisfying the condition, e.g., SIP No.=106 (see FIG. 24), and determines whether an auxiliary AV center is connected or not by issuing a dummy command to the addresses 1C9H, 1CAH, . . . , 1CFH. If an auxiliary AV center is connected, then the microcomputer for AV bus control in the AV center sets a mask bit at the flag of the auxiliary AV center in the IHP.

If the microcomputer for AV bus control in the AV center selects a system configuration of SIP No.=109 (see FIG. 24), then a component device which is not actually connected is assigned. Based on the SIP, the microcomputer for AV bus control issues a certain command (which may be an inquiry command) to various component devices. If a component device is not connected, a transmission error occurs, indicating that the device does not exist.

Then, the microcomputer for AV bus control in the AV center issues a dummy command to the addresses 1C9H, 1CAH, . . . , 1CFH to determine whether an auxiliary AV center is connected. If the connection of an auxiliary AV center is confirmed, then the microcomputer for AV bus control sets a mask bit at the flag of the auxiliary AV center in the IHP in the AV center.

After the actual connected state has been confirmed, the SIP No. is not changed, and information regarding component devices not used is stored in the memory 7, for example. The system connection is controlled based on the SIP No. and the non-connection information. It is practical to represent the non-connection information with 1 byte because 2 bytes composed of the SIP No. and the non-connection information allow use of a nonvolatile memory for storing channel information.

In applications that can be simply handled, use and non-use of 8 plugs can be controlled with one byte. Specifically, if the AV center has up to 8 plugs, then the 1 byte may be used to inhibit the use of certain plugs of a plug arrangement of the AV center which is specified by the SIP even when the SIP is selected to be slightly large.

The system may be checked with an OSD menu after the SIP No. has been set, or by checking whether each component is actually connected to the bus when the SIP is selected. However, it is impossible to check whether AV signal lines are correctly connected to the plugs. Such a connection check may be carried out by checking a video signal from a playback device using PinP (picture-in-picture).

FIGS. 22 through 25 show, by way of example, designated SIP numbers. At an SIP No. 41, a TV set having three plugs is used as an AV center, and a VTR, an AAMP (audio amplifier), and a VTUNER (video tuner) are connected to the respective plugs.

[NOX] in FIGS. 22 through 25 indicates that an SIP having a number smaller than NOX can be expressed by an SIP of NOX by adding an upper system configuration, i.e., an IHP. For example, an SIP of No. 5 can contain SIPs of Nos. 1 through 4 by combining with an IHP.

"*" in FIGS. 22 through 25 indicates that component devices are connected in layers. For example, at an SIP of No. 6, a TV set as an AV center has only two plugs, but two VTRs and one LDP are connected thereto. In this example, the VTR 2 is connected to the VTR 1 which is connected to the TV.

FIGS. 26 through 31 show specific AV system configurations, by way of example. In FIG. 26, at an SIP of No. 5, a plug 1 of a VTR 1 having an address 120H is connected to a plug 1 of a TV set as an AV center, a plug 1 of a VTR 2 having an address 121H is connected to a plug 2 of the TV set, and a plug 1 of an LDP having an address 130H is connected to a plug 3 of the TV set.

FIGS. 32 through 35 show, by way of example, other designated SIP numbers.

FIG. 36 shows another process of setting a system configuration different from the SIPs (system configurations) stored in the system configuration information ROM 5A. When a certain button (additional registration button) on the commander 12 is operated, the process is started. First, the microcomputer 9 for AV bus control controls the CRT 13 to display an additional registration menu in a step S201. The menu includes a plurality of or all system configurations (SIPs). Then, in a step S202, while seeing the displayed menu, the user operates the commander 12, for example, to select an SIP to additionally register AV component devices.

When an SIP is selected, the system configuration of the selected SIP is displayed on the CRT 13 in a step S203. In each SIP, a certain empty plug is available. Stated otherwise, in the SIP, connections of certain AV component devices to the other plugs than the empty plug are defined. Specifically, the user constructs an AV system of predetermined AV component devices, sets up a certain SIP, and thereafter make a certain empty plug available in advance for addition of another AV component device in the future.

Then, control proceeds to a step S204 in which the user operates the commander 12 to indicate an AV component device to be added to the empty plug. Thereafter, in a step S205, the microcomputer 9 additionally sets up and register the AV component device indicated in the step S204 at the SIP selected in the step S202.

The above process makes it quite easy to add a certain AV component device to an AV system which has already been set up. If there is an AV component device in the AV system which has the same device address as that of the added AV component device, the device address of the added AV component device is defined as a device address next to the device address of the existing AV component device because if there were a plurality of identical device addresses in the AV system, the AV component devices of the identical device addresses would respond to various requests from the AV center, causing the AV system to become confused. Overlapping device addresses may also be avoided either automatically by the AV center or manually by the user to change device addresses when an error is displayed due to the existence of identical device addresses.

FIG. 37 shows another process of confirming a connected state of a connected AV component device. In this process, one given AV component device is selected from AV components contained in an SIP that has already been set up in a step S211. In a step S212, signal lines are maintained between the AV component device selected in the step S211 and the CRT 13 and also between the AV component device and the loudspeaker (not shown).

In a step S213, the microcomputer 9 for AV bus control requests the AV component device selected in the step S211 to output a test signal. For example, if the selected AV component device is a VTR, then the microcomputer 9 requests the VTR to output a video signal and an audio signal as a test signal. At this time, the microcomputer 9 outputs an existence confirmation command to the VTR.

In response to the test signal output request and the existence confirmation command received in the step S213, the VTR outputs a demodulated signal from a built-in video tuner or a reproduced signal from a video tape. The outputted signal from the VTR is supplied to the CRT 13 or the non-illustrated loudspeaker through the signal lines maintained in the step S212. The user can now confirm whether the video and audio signals are supplied properly to the CRT 13 and the loudspeaker.

The VTR (and also other AV component devices) has an output unit for outputting a signal corresponding to the existence confirmation command when it receives the existence confirmation command. The output unit may comprise a lamp or a loudspeaker. Specifically, the AV component device (VTR in this case) which has received the existence confirmation command flickers the lamp or outputs a certain speech signal from the loudspeaker to let the user know that the AV component device itself is outputting the test signal. When the user sees the display of the lamp or hears the speech signal, the user can confirm the AV component device which is outputting the test signal.

In a step S214, the microcomputer 9 controls the CRT 13 to display letters indicating that the video signal displayed on the CRT 13 or the speech signal outputted from the loudspeaker is a test signal. A step S215 then determines whether the steps S211 through S214 have been carried out with respect to all the AV component devices of the AV system, i.e., the AV component devices which can output a test signal. If there is any AV component device which has not yet outputted a test signal, then control returns to the step S211, and the subsequent steps are repeated.

If the outputting of a test signal from all the AV component devices is determined as being finished in the step S215, then control proceeds to a step S216 in which a new AV component device is selected. In a step S217, a signal line is maintained between the selected AV component device and the microcomputer 9 for AV bus control. In a step S217, the selected AV component device is requested to output a test signal.

In response to the test signal output request, the AV device outputs a video signal and an audio signal in the same manner as described above. The microcomputer 9 monitors the outputted video and audio signals, and determines whether the AV component device is connected correctly in a step S219. Specifically, even when a video signal, for example, from the AV component device is displayed on the CRT 13 and an audio signal therefrom is outputted to the loudspeaker as a result of the execution of the steps S211 through S215, the AV component device may possibly be connected to a plug of the AV center to which the AV component device should not be connected, and the signals may be outputted from the plug. In addition, left and right channels of the audio signal may be connected in error. The microcomputer 9 determines whether the above wrong connections have been made or not. If a wrong connection has been made, control goes to a step S220 in which such a wrong connection is displayed on the CRT 13 (an error is displayed).

The steps S216 through S220 are repeatedly executed until all the AV component devices have been processed in the same manner as described above in a step S221.

As shown in FIG. 38, the steps S219, S220 may be inserted between the steps S214, S215, and the steps S216 through S218, S221 shown in FIG. 37 may be dispensed with.

In the above embodiments, the AV component devices are arranged to output a test signal. However, a test signal may be generated from a built-in video tuner of the AV center. In this case, the AV center maintains a signal line from the AV center to an AV component device to be tested, and also a signal line from the AV component device to the AV center. A test signal transmitted from the AV center and inputted to the AV component device is returned to the AV center. In this manner, the signal lines can be checked for reciprocating transmission thereover.

The connected state can be confirmed in the manner described above.

The illustrated embodiments are directed to an AV system. However, the principles of the present invention are also applicable to any of various systems including communication systems on transportation apparatus, e.g., airplanes, automobiles, trains, ships, and buses, communication systems composed of personal computers, systems composed of a personal computer and AV component devices, and systems for controlling remove devices with a modem through a telephone line or radio communications.

We claim:

1. An AV system comprising an AV center and a plurality of AV component devices,
said AV center comprising:
configuration storage means for storing a plurality of predetermined system configurations of the plurality of AV component devices;
user input means for determining an actual system configuration based on input from a user;
identification means for identifying a one of the plurality of predetermined system configurations that most closely matches the actual system configuration; and
a nonvolatile memory for storing at least pointer information indicating a location of the one of the plurality of predetermined system configurations stored in said configuration storage means that most closely matches the actual system configuration.

2. An AV system comprising an AV center and a plurality of AV component devices,
said AV center comprising:
configuration storage means for storing a plurality of predetermined system configurations of the plurality of AV component devices;
selecting means for selecting one of the predetermined system configurations in response to information from a user; and
a nonvolatile memory for storing at least pointer information indicating the location of the predetermined system configuration in said configuration storage means selected by said selecting means.

3. An AV system comprising an AV center and a plurality of AV component devices,
said AV center comprising:
configuration storage means for storing a predetermined system configuration of the plurality of AV component devices; and
a nonvolatile memory for storing difference information indicative of a difference between the predetermined system configuration stored in said configuration storage means and a given system configuration,
said configuration storage means containing a comprehensive system configuration including characteristics of a plurality of system configurations between said AV center and said AV component devices.

4. An AV system comprising an AV center and a plurality of AV component devices,
said AV center comprising:
configuration storage means for storing a plurality of predetermined system configurations of the plurality of AV component devices;
selecting means for selecting one of the plurality of system configurations in response to information from a user that most closely matches an actual system configuration input by the user; and
a nonvolatile memory for storing difference information indicative of a difference between a predetermined system configuration stored in said configuration storage means selected by the selecting means and the actual system configuration input by the user.

5. An AV system comprising an AV center and a plurality of AV component devices,
said AV center comprising:
configuration storage means for storing a predetermined system configuration of the plurality of AV component devices;
configuration determining means for determining an actual system configuration;
difference determining means for determining a difference between the predetermined system configuration and the actual system configuration; and
a nonvolatile memory for storing pointer information indicating a location of the predetermined system configuration stored in said configuration storage means and difference information indicative of the difference between the predetermined system configuration stored in said configuration storage means and the actual system configuration determined by the configuration determining means.

6. An AV system according to claim 2, wherein said nonvolatile memory additionally stores inhibit plug information indicative of plugs of the plurality of AV component devices to be inhibited.

7. An AV system according to claims 1 or 6, wherein said AV center and said AV component devices are connected to each other by an AV bus, said AV center further comprising control means for controlling data transmission between said AV center and said AV component devices through said AV bus.

8. An AV system according to claim 7, further comprising display means for displaying information relating to connection settings of the plurality of AV component devices, wherein when a connection is to be set up said control means causes the display means to display a command for prompting the user to input information about an AV component device to be connected, generates said pointer information indicative of the system configuration selected by the user, and stores said pointer information in said nonvolatile memory.

9. An AV system comprising an AV center and a plurality of AV component devices, said AV center comprising:
configuration storage means for storing a plurality of predetermined system configurations of the plurality of component devices;

system configuration determining means for determining an actual configuration based on a request from a user, wherein the system configuration determining means includes a display means for prompting the user to enter the request;

a bus connecting the AV center and the plurality of AV components for communicating data, wherein the bus includes a bus controller for controlling transmission of the data;

selecting means for selecting one of the system configurations stored in said configuration storage means most closely matching the system configuration requested by the user, for generating a pointer to the one selected configuration, and determining a difference between the one system configuration selected and the actual system configuration and generating difference information;

inhibit plug determining means for determining if the actual system configuration includes inhibited plugs and for generating inhibit plug information; and a nonvolatile memory for storing at least the pointer, the difference information, and the inhibit plug information.

10. An AV system according to claim 1, wherein said identification means includes inhibit plug determining means for determining if the actual system configuration includes inhibited plugs, for generating inhibit plug information, and wherein the nonvolatile memory stores the inhibit plug information if the system configuration has inhibited plugs.

11. An AV system according to claim 8, wherein said control means causes said display means to display a procedure for connecting AV lines of said AV component devices on said display means.

12. An AV system according to claim 11, wherein said control means requests the AV component devices to generate a test signal to confirm a connected state of the AV component devices.

13. An AV system according to claim 12, wherein said control means transmits a confirmation request signal to the AV component devices, and the AV component devices output a configuration signal in response to the confirmation request signal.

14. A method of establishing a connection setting in order to connect an AV center and a plurality of AV component devices in operational layers, comprising the steps of:

displaying a plurality of connection patterns of the plurality of AV component devices stored in connection pattern storage means on display means for each of the layers;

accepting a selection, by a user, of a certain pattern from said connection patterns which are displayed;

determining a location of the selected connection pattern in said pattern storage means; and storing said location in a nonvolatile pointer storage memory.

15. A method according to claim 14, further comprising the step of:

prompting the user to input information relating to an AV component device which is requested to be connected by the user, and establishing a connection pattern corresponding to the information which is inputted.

16. A method according to claim 15, further comprising the step of:

if the connection pattern which the user desires is not one of the plurality of connection patterns stored in said connection pattern storage means, connecting another AV component device to an empty terminal of a given one of the AV component devices of a stored connection pattern, and establishing a new connection pattern in which the AV component device connected to the empty terminal is added to the plurality of stored connection patterns.

* * * * *